US012645443B2

(12) United States Patent
Behrens et al.

(10) Patent No.: US 12,645,443 B2
(45) Date of Patent: Jun. 2, 2026

(54) DATABASE REPLICATION WITH HOST VERSION UPGRADE

(71) Applicant: SAP SE, Walldorf (DE)

(72) Inventors: Markus Behrens, Berlin (DE); Reiner Singer, Schriesheim (DE); Werner Thesing, Lautertal (DE); Yue Zhu, Heidelberg (DE); Mitja Kleider, Heidelberg (DE); Omran Saleh, Wiesloch (DE); Timo Sulg, Frankfurt (DE); Jan Scheperski, Wildau (DE); Markus Glatz, Heidelberg (DE); Steffen Michael Wagner, Waghausel (DE); Ahsan Nasir, Frankfurt (DE)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 18/228,412

(22) Filed: Jul. 31, 2023

(65) Prior Publication Data

US 2025/0045034 A1     Feb. 6, 2025

(51) Int. Cl.
*G06F 9/445* (2018.01)
*G06F 8/65* (2018.01)
*G06F 16/27* (2019.01)

(52) U.S. Cl.
CPC ................ *G06F 8/65* (2013.01); *G06F 16/27* (2019.01)

(58) Field of Classification Search
CPC ... G06F 8/65; G06F 8/71; G06F 16/23; G06F 8/60; G06F 16/235; G06F 40/197; G06F 16/27
See application file for complete search history.

(56) References Cited

U.S. PATENT DOCUMENTS

| | | | |
|---|---|---|---|
| 9,804,935 B1 | 10/2017 | Holenstein et al. | |
| 10,002,247 B2 * | 6/2018 | Suarez | G06F 21/31 |
| 11,436,097 B1 | 9/2022 | Kumar et al. | |
| 11,947,555 B1 | 4/2024 | Mohideen et al. | |
| 11,966,411 B1 | 4/2024 | Rajgaria et al. | |
| 12,332,754 B2 | 6/2025 | Behrens et al. | |
| 12,332,913 B2 | 6/2025 | Behrens et al. | |

(Continued)

FOREIGN PATENT DOCUMENTS

EP          4083786          11/2022

OTHER PUBLICATIONS

"SAP HANA System Replication", SAP HANA Platform 2.0 SPS 05. Document version 1.1—Jul. 30, 2021, (Jul. 30, 2021), 274 pgs.

(Continued)

*Primary Examiner* — Chuck O Kendall

(74) *Attorney, Agent, or Firm* — SCHWEGMAN LUNDBERG & WOESSNER, P.A.

(57) ABSTRACT

Various examples are directed to systems and methods for operating a database management system. A first host of a first version may be executed at a first container of a cloud environment. A second host of a second version may be executed at a second container of the cloud environment. The first host may be configured to perform a source role and the second host may be configured to perform a replica role corresponding to the source role. A network layer executing at the cloud environment may receive a request directed to the second host. The network layer may determine that the request is consistent with allowed request data describing allowed requests and may send the request to the second host.

20 Claims, 15 Drawing Sheets

(56) References Cited

U.S. PATENT DOCUMENTS

| 2011/0173233 | A1 | 7/2011 | Matsumura et al. | |
| 2013/0282666 | A1 | 10/2013 | Mcgee et al. | |
| 2015/0046744 | A1 | 2/2015 | Frerking | |
| 2017/0116232 | A1 | 4/2017 | Marwah et al. | |
| 2018/0074915 | A1 | 3/2018 | Yang et al. | |
| 2018/0246928 | A1 | 8/2018 | Kim et al. | |
| 2018/0336258 | A1 | 11/2018 | Lee et al. | |
| 2019/0306236 | A1 | 10/2019 | Wiener et al. | |
| 2019/0332269 | A1 | 10/2019 | Greenwood et al. | |
| 2019/0349205 | A1* | 11/2019 | Brady | G06F 21/12 |
| 2020/0097556 | A1 | 3/2020 | Chen et al. | |
| 2021/0334003 | A1 | 10/2021 | Agrawal et al. | |
| 2022/0030062 | A1 | 1/2022 | Jennings et al. | |
| 2022/0253363 | A1 | 8/2022 | Zhang et al. | |
| 2022/0382742 | A1 | 12/2022 | Procek et al. | |
| 2023/0229363 | A1 | 7/2023 | Karr et al. | |
| 2023/0229572 | A1 | 7/2023 | Murata | |
| 2024/0069779 | A1 | 2/2024 | Nhs et al. | |
| 2024/0126536 | A1* | 4/2024 | He | G06F 8/65 |
| 2024/0256572 | A1 | 8/2024 | Toste Gomes et al. | |
| 2025/0045178 | A1 | 2/2025 | Behrens et al. | |
| 2025/0045296 | A1 | 2/2025 | Behrens et al. | |
| 2025/0045297 | A1 | 2/2025 | Behrens et al. | |
| 2025/0225040 | A1 | 7/2025 | Behrens et al. | |

OTHER PUBLICATIONS

"U.S. Appl. No. 18/228,446, Non Final Office Action mailed Aug. 28, 2024", 52 pgs.
"U.S. Appl. No. 18/228,446, Response filed Nov. 19, 2024 to Non Final Office Action mailed Aug. 28, 2024", 12 pgs.
"U.S. Appl. No. 18/228,395, Non Final Office Action mailed Nov. 20, 2024", 12 pgs.
"U.S. Appl. No. 18/228,446, Examiner Interview Summary mailed Nov. 25, 2024", 3 pgs.
"European Application No. 24185975.0 Extended European Search Report mailed on Dec. 4, 2024", 50 pgs.
"U.S. Appl. No. 18/228,446, Final Office Action mailed Dec. 20, 2024", 59 pgs.
"U.S. Appl. No. 18/228,395, Response filed Dec. 31, 2024 to Non Final Office Action mailed Nov. 20, 2024", 12 pgs.
"U.S. Appl. No. 18/228,427, Non Final Office Action mailed Jan. 2, 2025", 9 pgs.
"U.S. Appl. No. 18/228,446, Examiner Interview Summary mailed Feb. 3, 2025", 3 pgs.
"U.S. Appl. No. 18/228,446, Response filed Feb. 20, 2025 to Final Office Action mailed Dec. 20, 2024", 14 pgs.
"U.S. Appl. No. 18/228,395, Notice of Allowance mailed Feb. 26, 2025", 9 pgs.
"U.S. Appl. No. 18/228,427, Response filed Mar. 31, 2025 to Non Final Office Action mailed Jan. 2, 2025", 11 pgs.
"U.S. Appl. No. 18/228,446, Notice of Allowance mailed Apr. 16, 2025", 9 pgs.
"U.S. Appl. No. 18/228,427, Final Office Action mailed Jul. 1, 2025", 10 pgs.
"U.S. Appl. No. 18/228,427, Response filed Oct. 1, 2025 to Final Office Action mailed Jul. 1, 2025", 11 pgs.
"SAP HANA System Replication", SAP HANA Platform 2.0 SPS 04. Document version 1.1—Oct. 31, 2019, (Oct. 31, 2019), 286 pgs.
"U.S. Appl. No. 18/228,427, Non Final Office Action mailed Oct. 21, 2025", 13 pgs.
"U.S. Appl. No. 18/228,427, Response filed Jan. 21, 2026 to Non Final Office Action mailed Oct. 21, 2025", 11 pgs.

* cited by examiner

200

202    RECEIVE UPGRADE
       INSTRUCTION

204    SHUT DOWN SECOND HOST

206    UPGRADE SECOND HOST
       TO UPGRADE VERSION

208    SYNCHRONIZED?                    NO

YES

210    CONFIGURE SECOND HOST
       TO SOURCE ROLE

212    SHUT DOWN FIRST HOST

214    UPGRADE FIRST HOST TO
       UPGRADE VERSION

216    RESTART FIRST HOST

300

302 — RECEIVE UPGRADE INSTRUCTION

304 — LAUNCH THIRD HOST WITH UPGRADE VERSION

306 — CONFIGURE THIRD HOST TO SOURCE ROLE

308 — SYNCHRONIZED?

NO

YES

310 — SHUT DOWN FIRST HOST

312 — UPGRADE FIRST HOST

314 — RESTART FIRST HOST

316 — CONFIGURE HOST ROLES

318 — SHUT DOWN SECOND HOST

400

402 — RECEIVE UPGRADE INSTRUCTION

404 — LAUNCH THIRD HOST WITH UPGRADE VERSION

406 — CONFIGURE THIRD HOST TO REPLICA ROLE

408 — SYNCHRONIZED?    NO

YES

410 — SHUT DOWN SECOND HOST

412 — UPGRADE SECOND HOST

414 — RESTART SECOND HOST

416 — CONFIGURE HOST ROLES

418 — SHUT DOWN FIRST HOST

500

502 — RECEIVE REQUEST DIRECTED TO REPLICA ROLE HOST

504 — ALLOWED?

NO

506 — DIRECT REQUEST TO SOURCE ROLE HOST

YES

508 — DIRECT REQUEST TO REPLICA ROLE HOST

600

700

702 — RECEIVE OPERATING PARAMETER CHANGE INSTRUCTION

704 — LAUNCH THIRD HOST WITH MODIFIED OPERATING PARAMETER(S)

706 — CONFIGURE THIRD HOST TO REPLICA ROLE

708 — SYNCHRONIZED?    NO    YES

710 — SHUT DOWN SECOND HOST

712 — MODIFY SECOND HOST OPERATING PARAMETER(S)

714 — RESTART SECOND HOST

716 — CONFIGURE HOST ROLES

718 — SHUT DOWN FIRST HOST

DATABASE REPLICATION WITH HOST VERSION UPGRADE

BACKGROUND

When operating a database management system, it is desirable to include a backup mechanism to make the database management system more robust to failures. For example, when the primary system fails, the backup system may be used to restore and/or replace the primary system.

BRIEF DESCRIPTION OF DRAWINGS

The present disclosure is illustrated by way of example and not limitation in the following figures.

DETAILED DESCRIPTION

Figure 1:
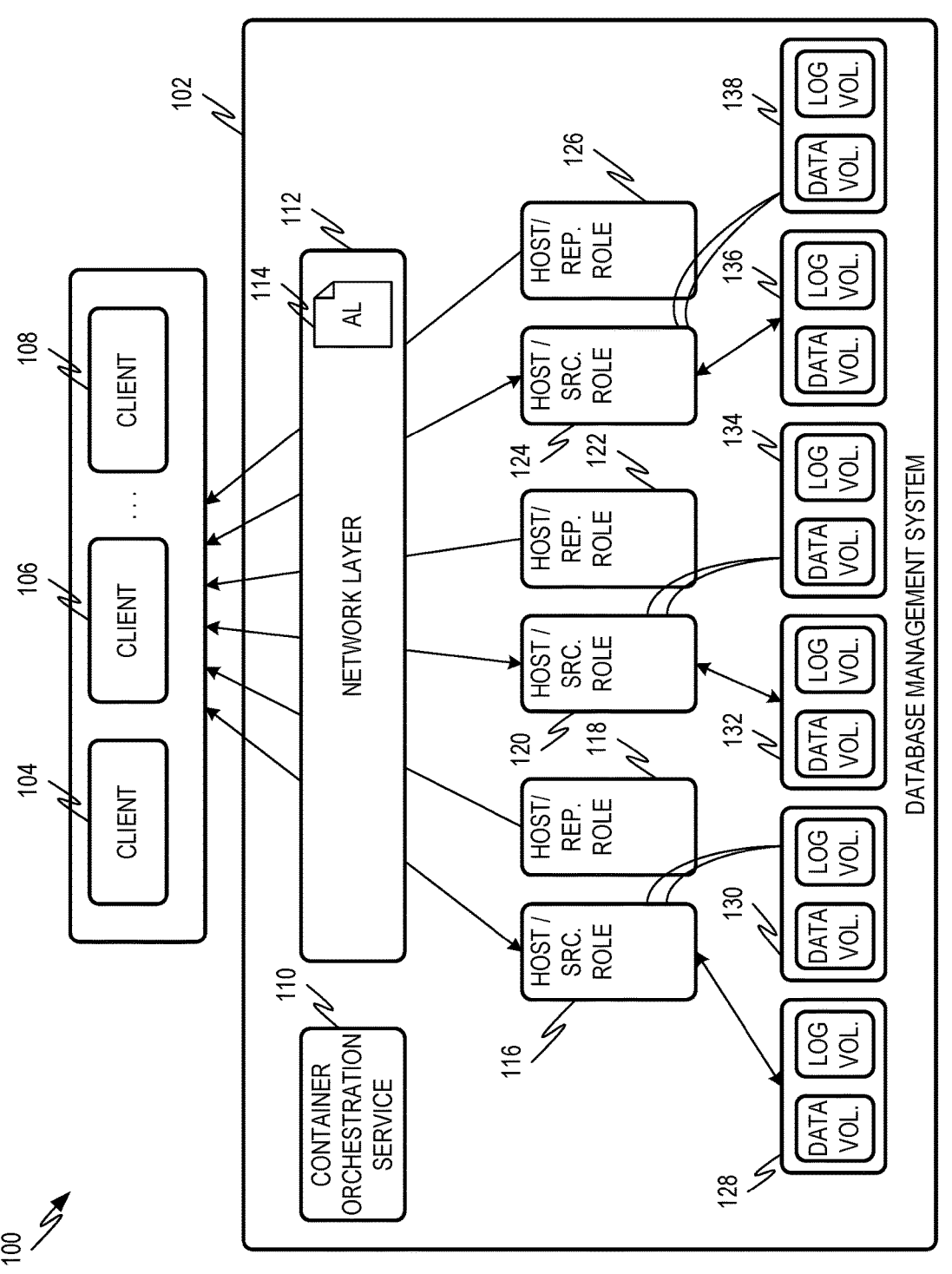
FIG. 1 is a diagram showing one example of an environment including a cloud-implemented database management system.

Replication is one example backup mechanism for a database management system. According to replication, a replica database management system is maintained along with a source database management system. In the event of a failure at the source database management system, the replica database management system assumes the role of the source database management system. For example, requests that were previously directed to the source database management system may be directed to the former replica database management system, now performing the role of the source database management system. In this way, the time to recovery, sometimes referred to as a recovery time objective (RTO), can be reduced. Because the replica database management system is maintained and updated with the source database management system, lost data can also be minimized. For example, the recovery point objective (RPO) may be close in time to the point at which the source database management system fails.

In some examples, replication is practiced in a multi-host database management system. A multi-host database management system includes multiple hosts that behave as a single unit. For example, clients utilizing the database management system may direct requests to the database management system without specifying a particular host. The database management system may distribute incoming requests to appropriate hosts for execution. Also, in some examples, a multi-host database management system may be identified by a single system identifier (SID). A multi-host database management system, in some examples, is arranged for a system administrator to perform various operations on the database management system as a whole, such as for example, shut down and start up.

Replication in a multi-host database management system can be handled on a host-by-host basis. For example, a host may perform a source role or a replica role associated with a source role. A host performing a source role may respond to requests as distributed by the database management system. A host performing a replica role may be maintained along with the source to be consistent with the source. If the host performing the source role fails, a takeover may occur with the host previously performing the replica role assuming the source role. Consider an example including a first host configured to perform a source role and a second host configured to perform a replica role for the source role. The first host and the second host may be maintained consistently. If a failure occurs involving the first host, a takeover may be executed. According to the takeover, the second host may be configured to perform the source role.

One potential disadvantage of host replication is that while the replica hosts are maintained all the time, they may only be used upon the failure of the corresponding source host. Some replication schemes address this and other issues with an active-active arrangement. In an active-active arrangement, replica hosts are configured to respond to read requests from clients. The database management system directs some read requests from clients to the replica hosts instead of to the corresponding source hosts. In this way, the availability of the database management system may increase and responses to client requests may be returned faster. In some examples, the database management system is arranged to direct resource intensive read requests, such as online transaction processing (OLTP) and/or online analytical processing (OLAP) requests to the hosts performing replica roles.

One challenge associated with replication schemes involves performing maintenance on the hosts. For example, it is often desirable to upgrade a host from one version to another version. To maintain replication, however, it is desirable to avoid shutting down a host performing a source role and a host performing its corresponding replica role at the same time so as to avoid system downtime.

Some examples described herein address these and other challenges by serially upgrading a host performing a source role and a host performing the corresponding replica role. Although this arrangement may avoid system downtime, it may also lead to a scenario in which the host performing the source role and the host performing the replica role are running different versions. When the host performing the source role and the host performing the replica role are running different versions, it may result in communication issues between the hosts. For example, communication issues may manifest in active-active arrangements. In an active-active arrangement, a host performing a replica role may read data from the host performing its corresponding source role. If the version difference between the source role and the replica role includes a difference in the database schema, the read request made by the host performing the replica role may not be readable by the host performing the source role. This could lead to various issues including, for example, data corruption and system crashes.

Various examples address these and other challenges by utilizing a network layer in the database management system. The network layer may be configured to apply an allow list to requests directed to and/or between hosts, such as between hosts performing different roles. When the host performing a source role and the host performing a corresponding replica role are executing different versions, the allow list may describe a set of requests that are permitted to be made by or to the host performing the replica role. For example, the allow list may indicate requests related to replication but may omit requests related to an active-active arrangement. For example, requests related to the active-active arrangement may be directed to the source role host instead of to the replica role host.

FIG. 1 is a diagram showing one example of an environment 100 including a cloud-implemented database management system 102. The environment 100 also includes one or more clients 104, 106, 108. Although three example clients 104, 106, 108 are shown, it will be appreciated that the environment 100 may include more or fewer clients. The clients 104, 106, 108 may be client applications that are configured to query the database management system 102. For example, clients 104, 106, 108 may be or include an analytics computing system, such as the SAP® Analytics Cloud application available from SAP SE of Waldorf, Germany; a human capital management software solution such as SAP SuccessFactors®, also available from SAP SE of Waldorf, Germany; and resources for project management provided by a project management software solution such as SAP Portfolio and Project Management (PaPM), also available from SAP SE of Waldorf, Germany.

The database management system 102 may be executed at a cloud environment, such as at a public cloud environment or a private cloud environment. In a private cloud environment, the enterprise implementing the database management system 102 may provide applications, storage, and the like, to implement the database management system 102. Executables and/or other software for implementing the database management system 102 at the private cloud environment may be provided, for example, by a software provider.

In a public cloud environment, the database management system 102 may be provided as one of a number of tenancies implemented by a hyper-scaler or other cloud service provider. The cloud service provider may provide one or more executables or other components to implement the database management system 102 at the public cloud environment. An enterprise using the database management system 102 may hold one or more tenancies, allowing clients 104, 106, 108 associated with the enterprise to access one or more instances of the database management system 102 at the public cloud environment.

In various examples, the database management system 102 is implemented in the cloud environment according to a microservice architecture. In a microservice architecture, different portions of the database management system 102 are implemented by a collection of loosely-coupled microservices executing at the cloud environment. Each microservice may include a single executable that executes in a container implemented by the cloud environment. In a microservice architecture, each microservice is programmed to perform a defined task or small set of tasks and interact with the other microservices in a defined way, for example, according to an application programming interface (API). In some examples, each host 116, 118, 120, 122, 124, 126 is operated as a separate independent micro-service executing in its own container or set of containers.

A container orchestration service 110 may manage the execution of the various containers implementing components of the database management system. In some examples, the container orchestration service 110 may be or include a Kubernetes R container orchestration system. The container orchestration service 110, in various examples, can start, restart, and/or modify containers executing various components of the database management system 102.

Hosts 116, 118, 120, 122, 124, 126 include hosts 116, 120, and 124 that are performing source roles and hosts 118, 122, and 126 that are performing replica roles corresponding to the respective source roles. In the example of FIG. 1, the host 116 is performing a first source role. The host 118 is performing a first replica role corresponding to the first source role. The host 120 is performing a second source role and the host 122 is performing a second replica role corresponding to the second source role. The host 124 is performing a third source role and the host 126 is performing a third replica role corresponding to the third source role. It will be appreciated that, although six hosts 116, 118, 120, 122, 124, 126 are shown in FIG. 1, the database management system 102 may have more or fewer hosts. Also, although the example of FIG. 1 includes a host performing a replica role for each respective source role, some implementations may not include a host performing a replica role for each respective source role.

Each host 116, 118, 120, 122, 124, 126 may execute at a respective container or set of containers. In some examples, the container orchestration service 110 may manage the execution of the hosts 116, 118, 120, 122, 124, 126. For example, if a host crashes, the container orchestration service 110 may restart a new container for the crashed host. In some examples, a crashed host may be restarted from a container image, such as a Docker® image provided by Docker, Inc.

In some examples, the database management system 102 may also manage the roles performed by the various hosts 116, 118, 120, 122, 124, 126. For example, a network layer 112 may be configured to direct requests from the clients 104, 106, 108 to the respective hosts 116, 118, 120, 122, 124, 126 and between the respective hosts 116, 118, 120, 122, 124, 126. For example, the database management system 102 may configure a given host 116, 118, 120, 122, 124, 126 to perform a source role or a replica role. Hosts 116, 118, 120, 122, 124, 126 configured to perform a source role may receive read and write requests from clients 104, 106, 108.

Hosts that are configured to perform a replica role may not receive requests from clients 104, 106, 108. In some examples, as described herein, hosts that are configured to perform a replica role may receive some read requests from clients 104, 106, 108, for example, according to an active-active arrangement.

The database management system 102 may be configured to perform replication between a host performing a source role and a host performing a corresponding replica role. For example, each host 116, 118, 120, 122, 124, 126 may have an associated persistency 128, 130, 132, 134, 136, 138. The persistencies 128, 130, 132, 134, 136, 138 may include data storage resources of the cloud environment that are assigned for use by the respective hosts 116, 118, 120, 122, 124, 126.

In some examples, the database management system 102 may be an in-memory database management system. For example, the hosts 116, 118, 120, 122, 124, 126 may store data making up the database at a random-access memory associated with the respective containers. Requests made to the host may be executed against the in-memory data.

The persistencies 128, 130, 132, 134, 136, 138 associated with the respective hosts 116, 118, 120, 122, 124 may comprise respective data volumes and log volumes. The data volume associated with a host may comprise snapshot data describing the data that is stored in-memory by the host. For example, the data volume for a host may be periodically created from the in-memory data at the host. The snapshot data stored at respective data volumes may have an associated snapshot time. The snapshot time for a data volume indicates the last time that the snapshot data stored at the data volume was reconciled with the in-memory data stored by the host. The log volume associated with a host, which may also be referred to as a redo log buffer, stores redo logs. A redo log describes a write operation executed at the corresponding host. A redo log may be replayed to recreate the write operation described by the redo log.

Collectively, the log volume and data volume associated with a host may be used to recreate the state of a host. For example, snapshot data from the data volume may be loaded to the random-access memory of the host. Subsequently, redo logs created after the snapshot time may be replayed at the host. This may recreate the state of the host up to the time of the most recent redo log. It will be appreciated that, in some examples, recreating a host from its associated data volume and log volume may be a time-consuming operation. For example, loading a data snapshot from the data volume to the random-access memory of a host can take a considerable amount of time, lengthening the RTO of the system. Utilizing replica role hosts, as described herein, may reduce the RTO. For example, a takeover in which a replica role host begins to perform a source role may take considerably less time than recreating the original source role host from its data volume and log volume.

The database management system 102 may manage replication between hosts 116, 120, 124 performing source roles and hosts 118, 122, 126 performing corresponding replica roles. Replication, in some examples, may be synchronous. For example, when a write request is executed at a host 116, 120, 124 performing a source role, the database management system 102 may write a redo log to the log volume associated with the host 116, 120, 124. The database management system 102 may also write the redo log to the log volume associated with the host 118, 122, 126 performing the replica role corresponding to the source role. The host 118, 122, 126 performing the replica role may also replay the redo log. In this way, the state of the host 118, 122, 126 performing the replica role may remain consistent with the state of the host

116, 120, 124 performing the source role. In some examples, the host 118, 122, 126 performing the source role may not commit a write request until it has received an indication that the redo log for that write request has been replayed at the corresponding host 118, 122, 126 performing the replica role.

In some examples, the database management system 102 may implement an active-active arrangement in which some read requests from clients 104, 106, 108 are directed to hosts 118, 122, 126 that are configured to perform replica roles. Accordingly, in addition to replaying redo logs received from hosts 116, 120, 124 performing source roles, the hosts 118, 122, 126 performing replica roles may also respond to read requests from clients 104, 106, 108, for example, as distributed by the network layer 112 or other suitable component of the database management system 102.

In the example of FIG. 1, the network layer 112 is configured to implement an allow list 114. The allow list 114 may describe requests that are permitted to be made by or directed to a host performing a replica role when the host is executing a different version than its corresponding source role host. For example, the allow list 114 may indicate that replication requests associated with replication are allowed. A replication request may be a request that is associated with maintaining the host performing the replica role in a state that is consistent with the corresponding host performing the corresponding source role. Examples include a request that the host performing a replica role replay redo logs generated by the corresponding host performing a source role. Allowed requests may also include requests that will not implicate differences between the versions of the respective hosts.

The allow list may indicate that other kinds of requests are not permitted. In some examples, requests of a type that are not described by the allow list are not permitted. Examples of requests that may not be permitted to be made to the host performing the replica role include read requests from clients associated with an active-active arrangement and requests executed by the host implementing the replica role, and on the version of the host and/or the database management system.

In some examples, the database management system 102 may support monitoring views, such as the M DISKS views available with HANA system from SAP SE of Walldorf, Germany. The structure of the monitoring views may change with different versions of the database management system 102. In such scenarios, a source role host may receive data with an unknown structure from a replica role host if the source role host and replica role hosts are of different versions. Such interactions may not be permitted when the host performing the replica role is of a different version than the host performing the source role.

Figure 2:
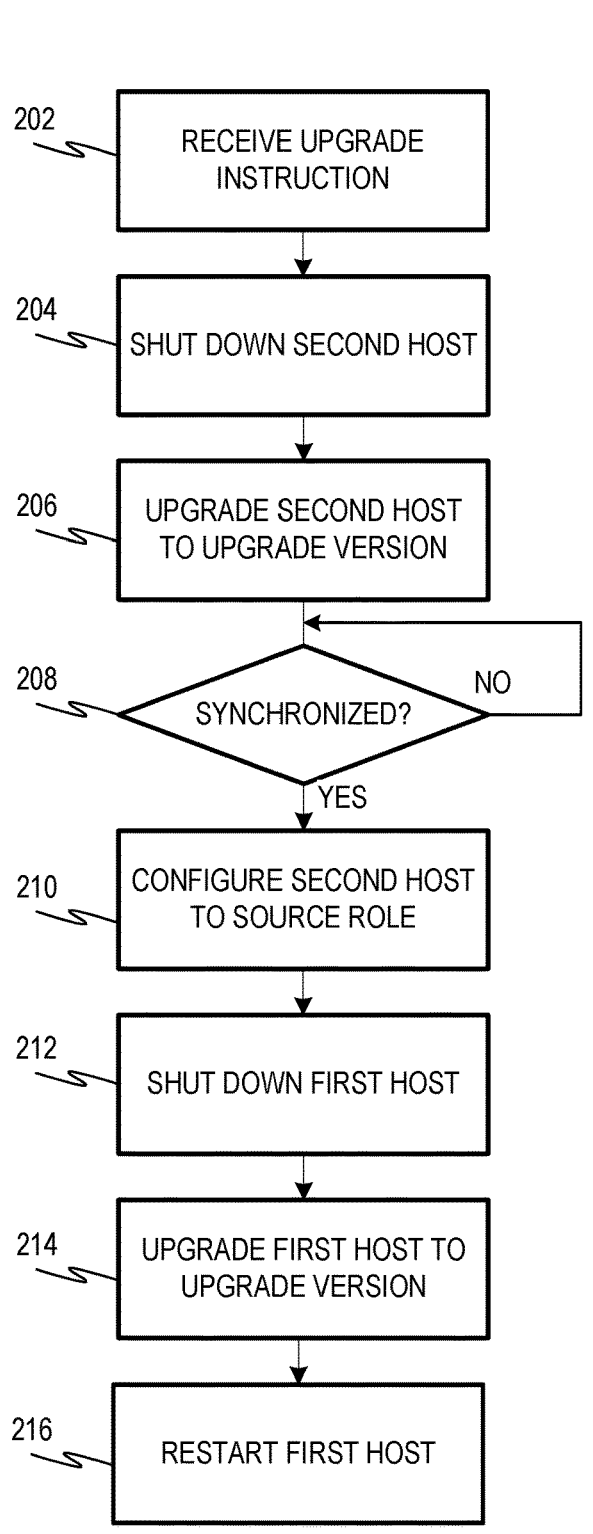
FIG. 2 is a flowchart showing one example of a process flow that may be executed in the environment of FIG. 1 to upgrade a pair of hosts to a target version.

FIG. 2 is a flowchart showing one example of a process flow 200 that may be executed in the environment 100 to upgrade a pair of hosts to a target version. The process flow 200 is described herein with respect to a first host and a second host. The first host is initially executing a source role, similar to the hosts 116, 120, 124 of FIG. 1. The second host is initially executing a replica role corresponding to the source role, similar to the hosts 118, 122, 126 of FIG. 1.

At operation 202, the database management system 102 may receive an upgrade instruction. The upgrade instruction may include a description of an upgrade to be performed. In some examples, the upgrade instruction may also indicate the host or hosts to be upgraded. For example, the upgrade instruction may include a description of the source role with an instruction that the hosts performing the source role and the corresponding replica role upgrade. The upgrade instruction may also indicate a target version that is the target of the upgrade.

The upgrade may include modifying at least one of the host 116, 118, 120, 122, 124, 126 from a current version to a target version. In some examples, the target version may reflect a new version of the software implementing the host and/or a new version of the database management system 102. Process flow 200 describes upgrading a pair of hosts implementing a source role and a corresponding replica role. It will be appreciated, however, that similar operations may be performed to upgrade more than one set of hosts, such as at all hosts 116, 118, 120, 122, 124, 126 or at a subset of the hosts 116, 118, 120, 122, 124, 126.

At operation 204, the database management system 102 may shut down the second host. As described herein, the second host is, initially, performing a replica role associated with the corresponding source role. At operation 206, the database management system 102 may upgrade the second host to the target version. This may include, for example, modifying a container image for the second host to include and/or refer to a code that implements the target version. Upgrading the second host may also include relaunching the second host, for example, by restarting the second host from the upgraded container image. Upon restarting, the second host may begin to synchronize with the first host executing the corresponding source role. For example, the second host may load the data snapshot from its data volume to random-access memory and/or play back redo logs from its log volume. In this way, the restarted second host may make itself consistent with the first host performing the corresponding source role.

At operation 208, the database management system 102 may determine whether the second host is synchronized with the first host. Synchronization may occur when the second host has successfully loaded snapshot data and/or played back relevant redo logs so that the second host is consistent with the first host. If the second host is not yet consistent with the first host, the database management system 102 may wait and then again determine whether the second host has become consistent with the first host. When the second host is consistent with the first host, the database management system 102 may proceed to operation 210.

At operation 210, the database management system 102 may execute a takeover in which the second host, now operating the target version, begins performing the source role originally performed by the first host. For example, requests that were previously directed to the first host may now be directed to the second host. At operation 212, the database management system 102 may shut down the first host. At operation 214, the database management system 102 may upgrade the first host to the target version, for example, in the manner described herein with respect to operation 206.

At operation 216, the database management system 102 may restart the first host. In some examples, the first host is restarted and configured to perform the replica role previously performed by the second host. Accordingly, the first host may begin to synchronize with the second host, which is now executing the source role.

Figure 3:
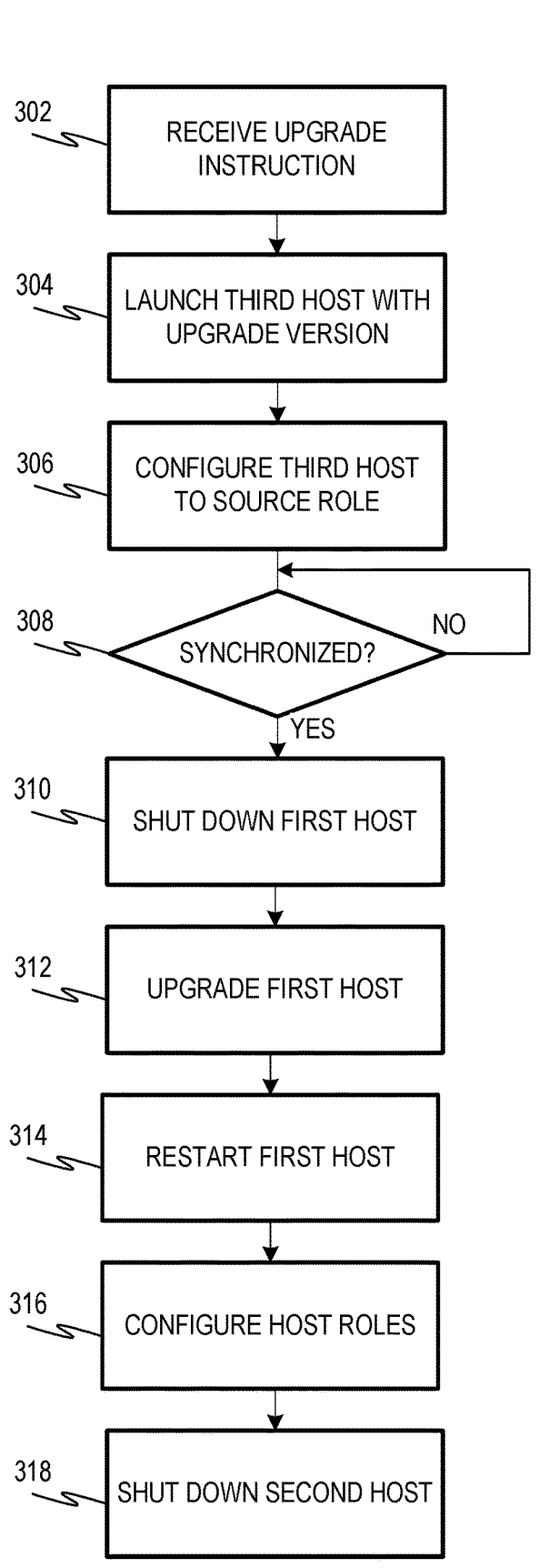
FIG. 3 is a flowchart showing another example of a process flow that may be executed in the environment of FIG. 1 to upgrade a pair of hosts to a target version.

FIG. 3 is a flowchart showing another example of a process flow 300 that may be executed in the environment 100 to upgrade a pair of hosts to a target version. The process flow 300 is described herein with respect to a first host and a second host. The first host is initially executing a source role, similar to the hosts 116, 120, 124 of FIG. 1. The second host is initially executing a replica role corresponding to the source role, similar to the hosts 118, 122, 126 of FIG. 1.

At operation 302, the database management system 102 may receive an upgrade instruction. The upgrade instruction may include a description of an upgrade to be performed. In some examples, the upgrade instruction may also indicate the host or hosts to be upgraded. For example, the upgrade instruction may include a description of the source role with an instruction that the hosts performing the source role and the corresponding replica role upgrade. The upgrade instruction may also indicate a target version that is the target of the upgrade.

At operation 304, the database management system 102 may launch a third host according to the target version. For example, the database management system 102 may launch the third host from a container image that is configured according to the target version. At operation 306, the database management system 102 may configure the third host to perform the source role being performed by the first host. The third host may begin to synchronize to the first host, for example, by loading a data snapshot reflecting the state of the first host and replaying any replay logs. At operation 308, the database management system 102 may determine whether the third host is synchronized to the first host. If the third host is not yet synchronized to the first host, the database management system 102 may continue to monitor the third host.

When the third host is synchronized to the first host, the database management system 102 may shut down the first host at operation 310. While the first host is shut down, the second host may continue to perform the replica role corresponding to the source role, now performed by the third host. In this way, replication may be maintained.

At operation 312, the database management system 102 may upgrade the first host to the target version, for example, as described herein. At operation 314, the database management system 102 may restart the first host, which is now running the target version. At operation 316, the database management system 102 may configure the roles of the first host and the third host, which are now both running the target version. In some examples, the database management system 102 configures as the first host to perform the replica role associated with the source role. In other examples, the database management system 102 configures the first host to perform the source role and reconfigures the third host to perform the corresponding replica role.

At operation 318, the database management system 102 may shut down the second host. In some example, the second host may not be shut down until the first host is synchronized with the third host and configured to perform either the source role or the corresponding replica role.

Figure 4:
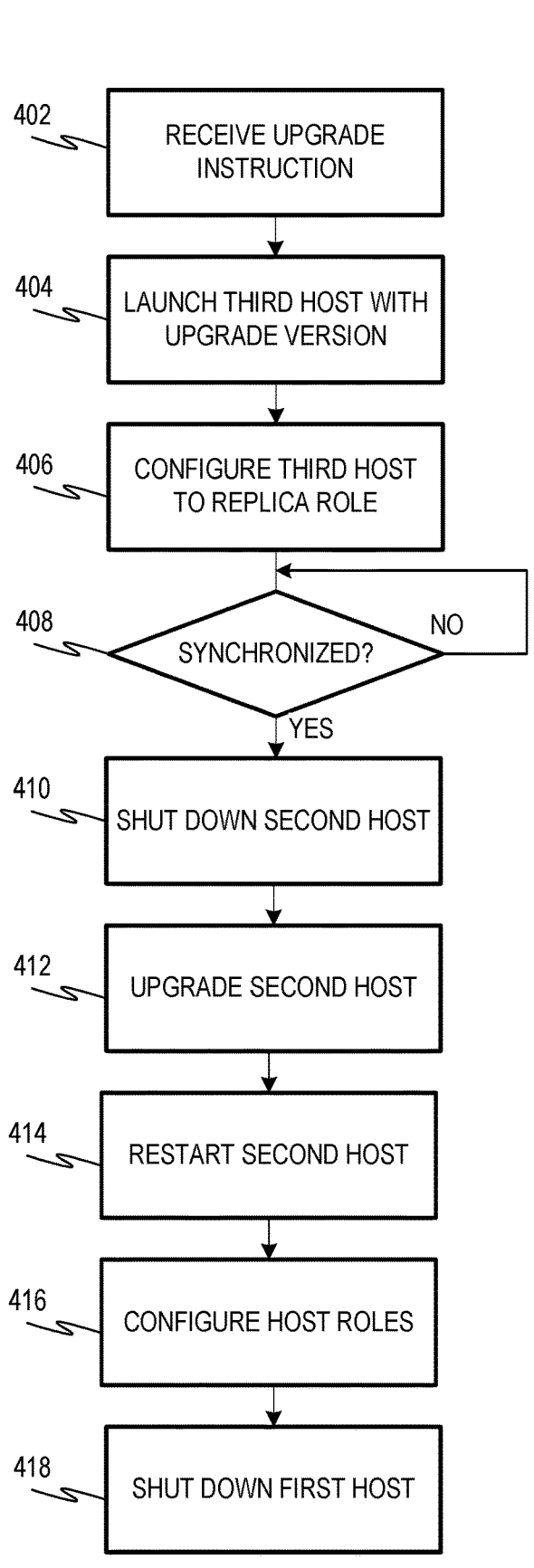
FIG. 4 is a flowchart showing another example of a process flow 400 that may be executed in the environment of FIG. 1 to upgrade a pair of hosts to a target version.

FIG. 4 is a flowchart showing another example of a process flow 400 that may be executed in the environment 100 to upgrade a pair of hosts to a target version. The process flow 400 is described herein with respect to a first host and a second host. The first host is initially executing a source role, similar to the hosts 116, 120, 124 of FIG. 1. The second host is initially executing a replica role corresponding to the source role, similar to the hosts 118, 122, 126 of FIG. 1.

At operation 402, the database management system 102 may receive an upgrade instruction. The upgrade instruction may include a description of an upgrade to be performed. In some examples, the upgrade instruction may also indicate the host or hosts to be upgraded. For example, the upgrade instruction may include a description of the source role with an instruction that the hosts performing the source role and the corresponding replica role upgrade. The upgrade instruction may also indicate a target version that is the target of the upgrade.

At operation 404, the database management system 102 may launch a third host according to the target version. For example, the database management system 102 may launch the third host from a container image that is configured according to the target version. At operation 406, the database management system 102 may configure the third host to perform the replica role being performed by the second host. The third host may begin to synchronize to the first host, for example, by loading a data snapshot reflecting the state of the first host and replaying any replay logs. At operation 408, the database management system 102 may determine whether the third host is synchronized to the first host. If the third host is not yet synchronized to the first host, the database management system 102 may continue to monitor the third host.

When the third host is synchronized to the first host, the database management system 102 may shut down the second host at operation 410. While the second host is shut down, the third host may perform the replica role corresponding to the source role performed by the first host. In this way, replication may be maintained.

At operation 412, the database management system 102 may upgrade the second host to the target version, for example, as described herein. At operation 414, the database management system 102 may restart the second host which is now running the target version. At operation 416, the database management system 102 may configure the roles of the second host and the third host, which are now both running the target version. For example, after the restart and after second host is synchronized with the first host, the database management system 102 may configure either the second host or the third host to perform the source role while the other of the second or the third host continues to perform the replica role. At operation 418, the database management system 102 may shut down the first host.

Process flows 200, 300, and 400 include periods during which the host executing a source role and the host executing the corresponding replica role are of different versions. In various examples, the network layer 112 may be configured to apply the allow list 114 to communications to and between the hosts 116, 118, 120, 122, 124, 126. The network layer 112 may apply the allow list 114 to communications to and/or from hosts of different versions that are performing corresponding source and replica roles.

Figure 5:
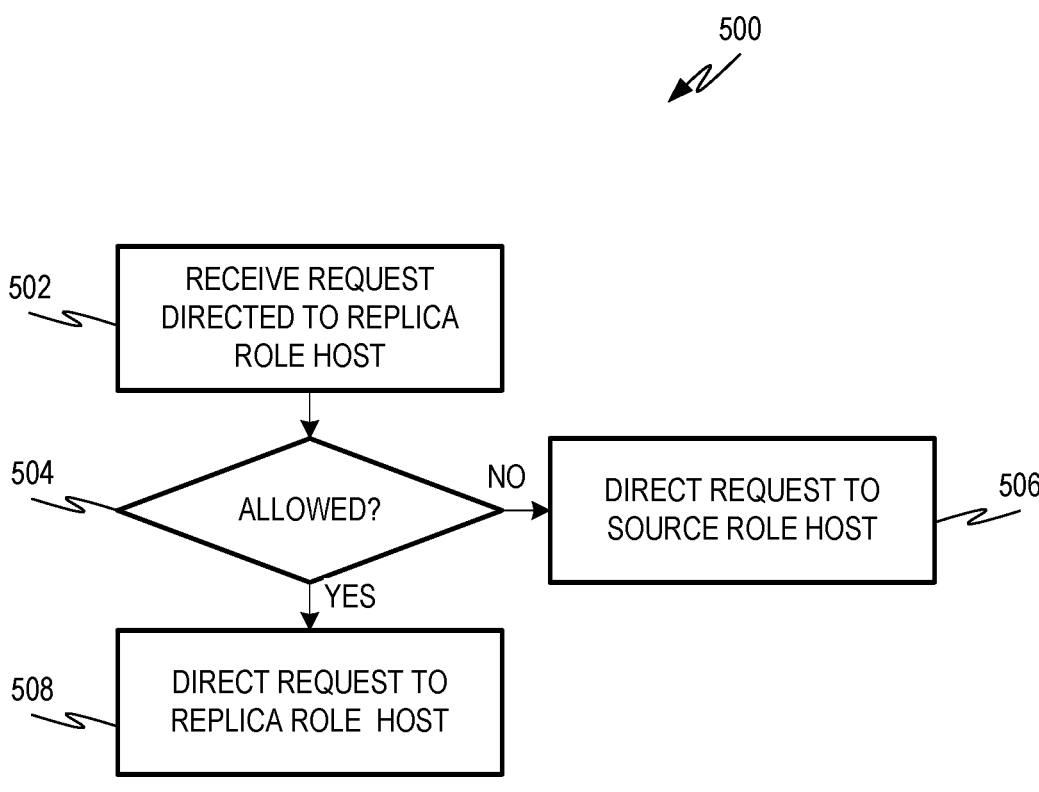
FIG. 5 is a flowchart showing one example of a process flow that may be executed in the environment of FIG. 1 to handle communications related to hosts executing different versions.

FIG. 5 is a flowchart showing one example of a process flow 500 that may be executed by the network layer 112 in the environment 100 to handle communications related to hosts executing different versions. At operation 502, the network layer 112 may receive a request directed to a host executing a replica role. The request may be directed to a host running a different version than the host performing the corresponding source role. At operation 504, the network layer 112 may determine if the request is allowed to be directed to the replica role host. If the request is allowed to be directed to the replica role host, the network layer 112 may direct the request to the replica role host at operation 508. If the request is not allowed to be directed to the replica role host, the network layer 112 may direct the request to the source role host at operation 506.

Another challenge in a cloud-implemented multi-host database management system occurs when it becomes desirable to change the operating parameters of a host. Administration of the database management system 102 may involve changing host operating parameters such as, for example, storage capacity, level of central processing unit (CPU) resources assigned to the host, level of memory resources assigned to the host, and/or the like. Making such a change to operating parameters, however, often involves restarting the host. For example, according to a container architecture, changing the operating parameters of a host may involve shutting down a currently-executing host and relaunching the host in a different container having different resources assigned to it.

When a host is shut down, however, it can lead to downtime for the database management system and/or a break in replication. For example, if a host performing a source role fails while the host performing the corresponding replica role is shut down for an operating parameters change, recovery may involve starting a new host and fully synchronizing the new host with the data snapshot and redo logs of the failed host. This can undesirably increase the RTO for the database management system 102.

Various examples address these and other issues by changing configuration parameters of the hosts serially. Consider an example in which a first host is executing a source role and a second host is executing a replica role for the source role. The second host may be shut down and modified according to a new set of operating parameters. The second host may then be restarted. When restarted, the second host may be configured to perform the source role. The first host may be shut down and modified according to the new set of operating parameters. The first host may then be restarted and configured to perform the replica role for the source role. Alternatively, the first host may be configured to perform the source role and the second host may be reconfigured to perform the replica role or the source role.

In another example, a third host may be started according to the new set of configuration parameters. The third host may be configured to perform either the source role or the corresponding replica role. Then, either the first or the second host can be shut down and subsequently restarted with updated configuration parameters. The restarted host may be configured to perform either the source role or the corresponding replica role. When the restarted host is synchronized, the remaining host may be shut down.

Figure 6:
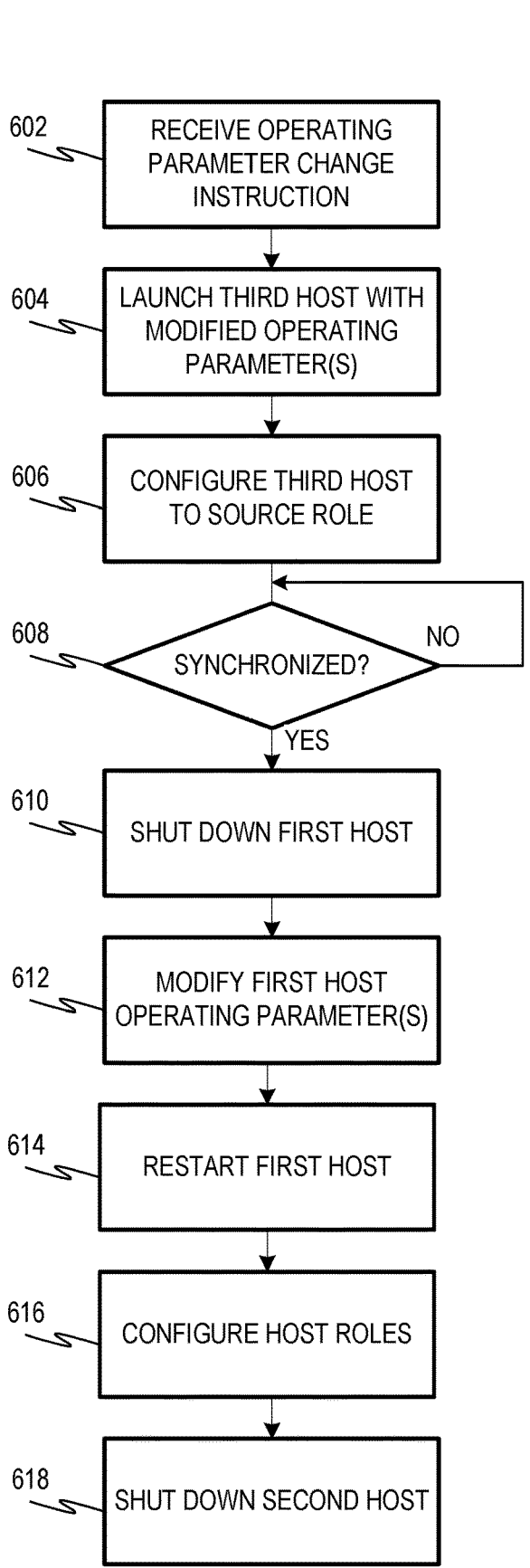
FIG. 6 is a flowchart showing one example of a process flow that may be executed in the environment of FIG. 1 to change operating parameters of a host.

FIG. 6 is a flowchart showing one example of a process flow 600 that may be executed in the environment 100 to change operating parameters of a host. The process flow 600 is described herein with respect to a first host and a second host. The first host is initially executing a source role, similar to the hosts 116, 120, 124 of FIG. 1. The second host is initially executing a replica role corresponding to the source role, similar to the hosts 118, 122, 126 of FIG. 1.

At operation 602, the database management system 102 receives an operating parameter change instruction. The operating parameter change instruction may indicate a change to the operating parameters of one or more hosts. For example, the operating parameter change instruction may indicate a target set of operating parameters.

At operation 604, the database management system 102 may launch a third host according to the target set of operating parameters. For example, the database management system 102 may launch the third host in a container that is configured according to the target set of operating parameters. At operation 606, the database management system 102 may configure the third host to perform the source role being performed by the first host. The third host may begin to synchronize to the first host, for example, by loading a data snapshot reflecting the state of the first host and replaying any replay logs. At operation 608, the database management system 102 may determine whether the third host is synchronized to the first host. If the third host is not yet synchronized to the first host, the database management system 102 may continue to monitor the third host.

When the third host is synchronized to the first host, the database management system 102 may shut down the first host at operation 610. While the first host is shut down, the second host may continue to perform the replica role corresponding to the source role, now performed by the third host. In this way, replication may be maintained.

At operation 612, the database management system 102 may modify the first host to the target set of operating parameters. For example, the database management system 102 may modify parameters of a container image describing a container in which the first host is to execute. At operation 614, the database management system 102 may restart the first host, which may now execute according to the target set of operating parameters. At operation 616, the database management system 102 may configure the roles of the first host and the third host, which are now both executing according to the target set of operating parameters. In some examples, the database management system 102 is configured as the first host to perform the replica role associated with the source role. In other examples, the database management system 102 configures the first host to perform the source role and reconfigures the third host to perform the corresponding replica role.

At operation 618, the database management system 102 may shut down the second host. In some example, the second host may not be shut down until the first host is synchronized with the third host and configured to perform either the source role or the corresponding replica role.

Figure 7:
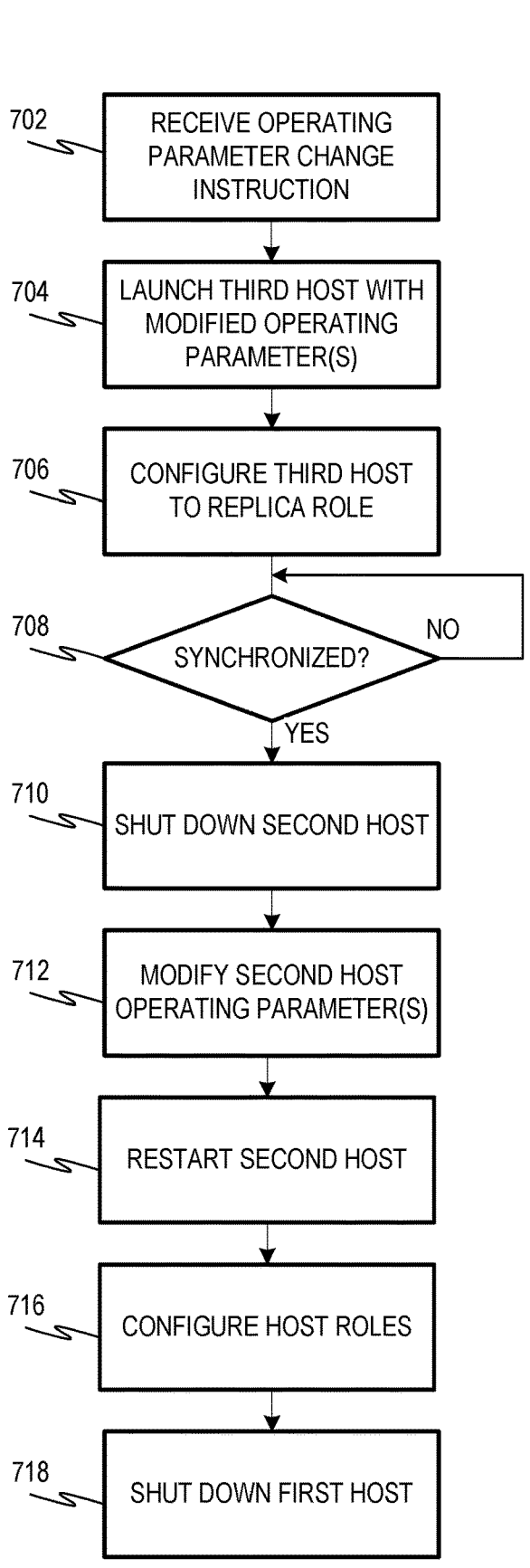
FIG. 7 is a flowchart showing another example of a process flow that may be executed in the environment of FIG. 1 to change operating parameters of a host.

FIG. 7 is a flowchart showing another example of a process flow 700 that may be executed in the environment 100 to change operating parameters of a host. The process flow 700 is described herein with respect to a first host and a second host. The first host is initially executing a source role, similar to the hosts 116, 120, 124 of FIG. 1. The second host is initially executing a replica role corresponding to the source role, similar to the hosts 118, 122, 126 of FIG. 1.

At operation 702, the database management system 102 may receive an operating parameter change instruction. The operating parameter change instruction may indicate a change to the operating parameters of one or more hosts. For example, the operating parameter change instruction may indicate a target set of operating parameters.

At operation 704, the database management system 102 may launch a third host according to the target set of operating parameters. For example, the database management system 102 may launch the third host in a container that is configured according to the target set of operating parameters. At operation 706, the database management system 102 may configure the third host to perform the replica role being performed by the second host. The third host may begin to synchronize to the first host, for example, by loading a data snapshot reflecting the state of the first host and replaying any replay logs. At operation 708, the database management system 102 may determine whether the third host is synchronized to the first host. If the third host is not yet synchronized to the first host, the database management system 102 may continue to monitor the third host.

When the third host is synchronized to the first host, the database management system 102 may shut down the second host at operation 710. While the second host is shut down, the third host may perform the replica role corresponding to the source role performed by the first host. In this way, replication may be maintained.

At operation 712, the database management system 102 may modify the second host to the target set of operating parameters. For example, the database management system 102 may modify parameters of a container image describing a container in which the second host is to execute. At operation 614, the database management system 102 may restart the second host, which may now execute according to the target set of operating parameters.

At operation 714, the database management system 102 may restart the second host which is now running the target version. At operation 716, the database management system 102 may configure the roles of the second host and the third host, which are now both operating according to the target set of operating parameters. For example, after the restart and after second host is synchronized with the first host, the database management system 102 may configure either the second host or the third host to perform the source role while the other of the second or the third host continues to perform the replica role. At operation 718, the database management system 102 may shut down the first host.

In some examples, a database management system, such as the database management system 102, may utilize host replication, as described herein, to mitigate failures of individual hosts. While such an arrangement may be effective to mitigate the failure of an individual host or hosts, it may be less effective against more widespread failures. For example, some or all of the database management system 102 may be implemented by computer hardware at a single data center administered by a hyper-scaler or other cloud provider. If the data center experiences a failure, all of the hosts implemented at the data center may go down.

Various examples address these and other problems by executing a secondary database management system at a remote data center. For example, a primary database management system, similar to the database management system 102, may be implemented at a data center in one geographic location. A secondary database management system may be implemented at a second geographic location different than the first geographic location. Accordingly, if a first data center executing all or part of the primary database management system experiences a failure, clients may continue to use the database management system by accessing the secondary database management system.

In various examples, however, it may not be practical to perform synchronous replication at a secondary database management system that is remote from a primary database management system. For example, the primary database management system may send redo logs to the secondary database management system, where the redo logs indicate executed write requests. According to a synchronous replication arrangement, however, the primary database management system would wait to commit requests until receiving an indication that the secondary database management system has replayed the redo logs. When the primary and secondary database management systems are implemented at different geographic locations, however, the communication delay associated with waiting for the secondary database management to confirm that it has replayed a redo log may create an unacceptable lag in the performance of the primary database management system.

In various examples, these and other challenges are addressed by implementing asynchronous replication at the secondary database management system. For example, when the primary database management system receives a write request, it may provide the secondary database management system with a redo log reflecting the write request, but may not wait for the secondary database management system to confirm playback of the redo log before committing the write request. In an asynchronous replication arrangement, there is no guarantee that the redo logs sent by the primary database management system will be received at the secondary database management system in the same order that they are sent.

An asynchronous arrangement between a primary database management system and a secondary database management system may provide for robustness in the event of a larger scale failure at the primary database management system. In the event of a failure of the primary database management system, the secondary database management system may assume the role of the primary database management system. For example, client requests may be directed to the secondary database management system instead of the primary database management system.

Because replication at the secondary database management system is asynchronous, some examples of secondary database management systems may not implement host replication. Accordingly, upon a takeover, a secondary database management system may operate without replication hosts. As a result, if a host failure occurs at the secondary database management system, the RTO (and sometimes the RPO) may not be acceptable for some enterprises. Accordingly, the secondary database management system can be configured to launch hosts to execute replica roles or each of its source roles upon a takeover. In these arrangements, there may be a time lag between the initiation of takeover and the time that the respective new hosts are launched, synchronized, and configured to perform replica roles. As a result, the secondary database management system may either operate without host replication until the replica role hosts are prepared, or the RTO for the initial takeover may be extended while the replica role hosts are prepared.

Various examples address these and other challenges by executing replica role hosts at a secondary database management system that is an asynchronous replica of a primary database management system. The secondary database management system may execute a coordinator component. The coordinator component may coordinate the play back of redo logs at the various source role and replica role hosts of the secondary database management system. Upon a takeover, the coordinator component may select a source role whose host has an oldest last valid commit. The coordinator component may revert the secondary database management system to the time of the oldest last valid commit prior to the takeover. In this way, the secondary database system may implement the various hosts performing replica roles while also executing a takeover in a state that is consistent with the primary database management system.

Figure 8:
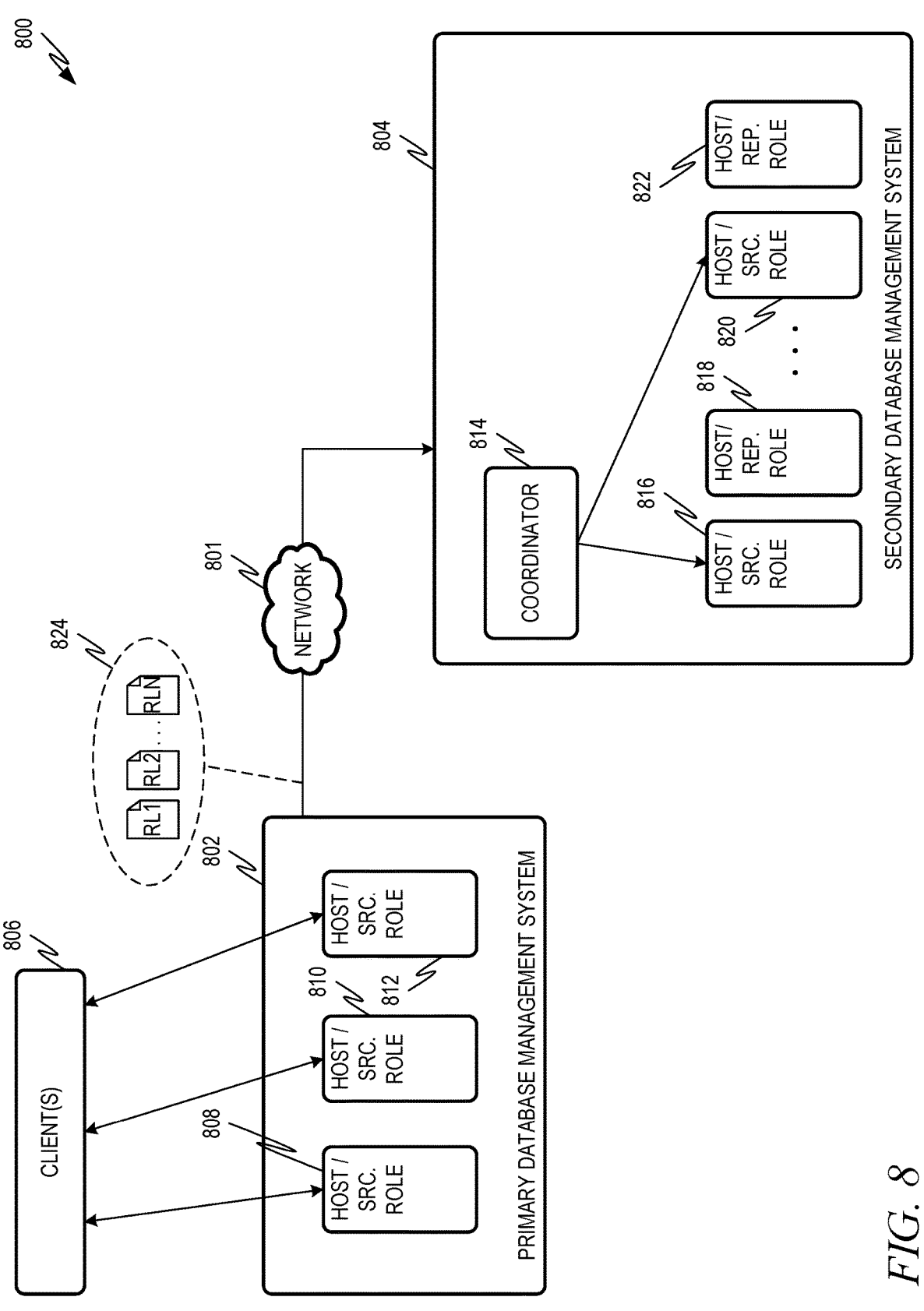
FIG. 8 is a diagram showing one example of an environment including a primary database management system and a secondary database management system.

FIG. 8 is a diagram showing one example of an environment 800 including a primary database management system 802 and a secondary database management system 804. In this example, the primary database management system 802 is configured to respond to requests from clients 806. The clients 806 may be similar to the clients 104, 106, and/or 108 of FIG. 1. The primary database management system 802 comprises hosts 808, 810, and 812. The hosts 808, 810, 812 are configured to perform source roles, as described herein. Although not specifically shown in FIG. 8, primary database management system 802 may also comprise one or more other hosts configured to perform replica roles relative to the source roles. Although three hosts 808, 810, and 812 are shown in FIG. 8, it will be appreciated that the primary database management system 802 may comprise more or fewer hosts than are shown.

The secondary database management system 804 comprises hosts 816, 818, 820, 822. In this example, hosts 816 and 820 are configured to perform respective source roles. Hosts 818 and 822 are configured to perform replica roles corresponding to the respective source roles. For example, the host 818 is configured to perform a replica role corresponding to the source role being executed by the host 816. Similarly, host 822 is configured to perform a replica role corresponding to the source role performed by the host 820. Also, although hosts performing two source roles are shown in FIG. 8, it will be appreciated that the secondary database management system 804 a comprise more or fewer hosts than are shown that may perform more or fewer source roles than are shown.

The primary database management system 802 may generate redo logs 824. Each redo log 824 corresponds to a write request executed at one of the hosts 808, 810, 812. In some examples, the redo logs 824 are used within the primary database management system 802 to perform synchronous replication of the respective hosts 808, 810, 812. The redo logs 824 may also be sent asynchronously to the secondary database management system 804 via a network 801. For example, the respective hosts 808, 810, 812 of the primary database management system may generate and send the redo logs 824, but may not wait for confirmation from the secondary database management system 804 before committing the corresponding write requests. The network 801 may be or include any suitable type of network or combination of networks including one or more local area networks (LANs), one or more wide area networks (WANs), and/or the like.

The redo logs 824 shown in FIG. 8 are arranged in chronological order and labeled RL1, RL2, . . . RLN. Because the redo logs 824 are transmitted asynchronously, however, there is no guarantee that they will arrive at the secondary database management system 804 in the same order that they were sent by the primary database management system 802. Accordingly, if the respective hosts 816, 820 implementing source roles were to replay the redo logs 824 in the order in which they are received at the secondary database management system 804, it may lead to a corruption of data at the respective hosts 816, 820

The secondary database management system 804 may comprise a coordinator component 814 that is configured to direct the redo logs 824 to the respective hosts 816, 818, 820, 822. The coordinator component 814, in various examples, may execute in a container in a manner similar to that of the respective hosts 816, 818, 820, 822. Coordinator component 814 may cache redo logs 824 received from the primary database management system 802 and provide the redo logs 824 to the respective hosts 816, 818, 820, 822 in the chronological order in which the redo logs 824 were sent from the primary database management system 802. In some examples, the coordinator component 814 is also configured to configure the secondary database management system 804 for a takeover of a source role and place of the primary database management system 802.

Figure 9:
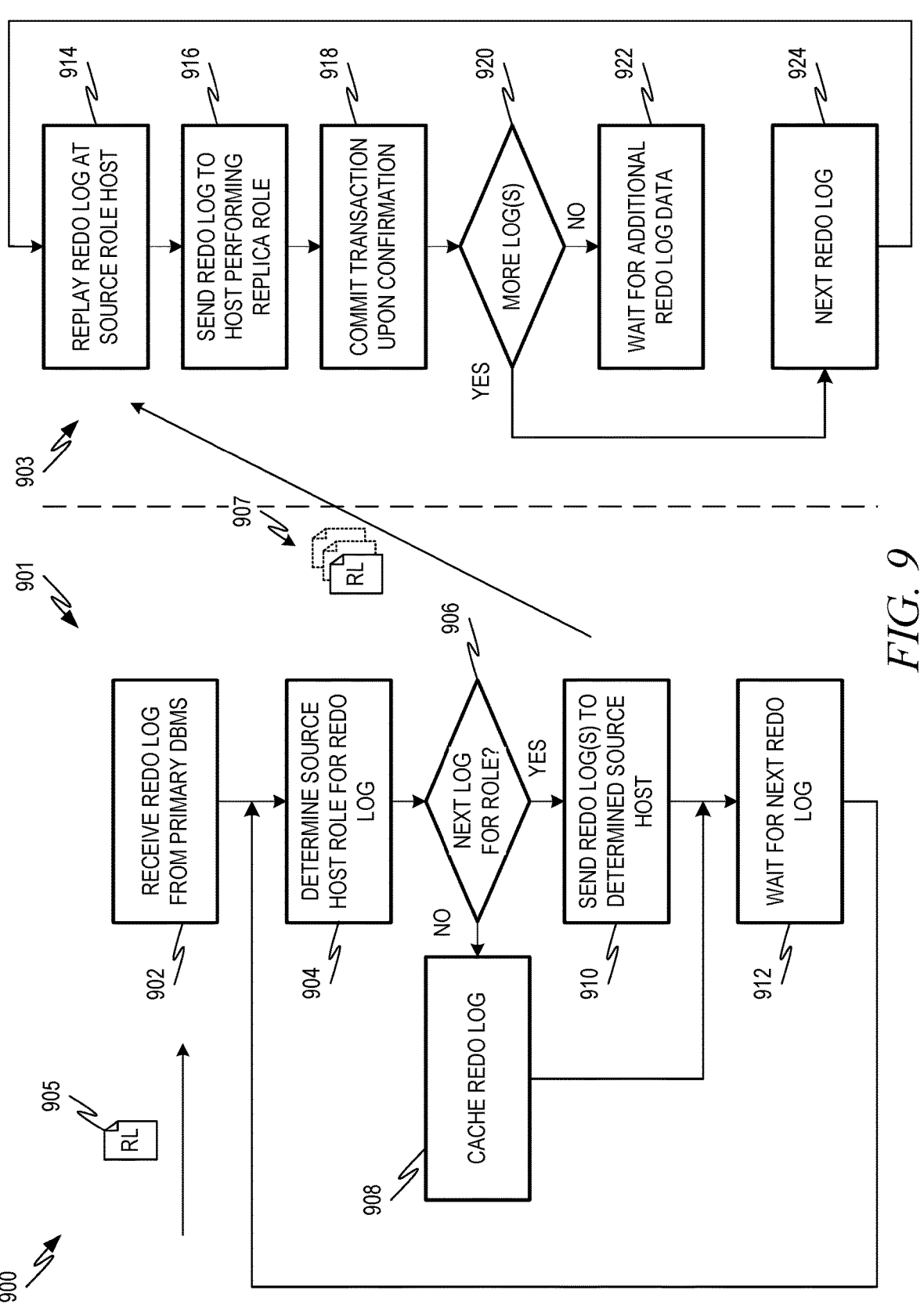
FIG. 9 is a flowchart showing one example of a process flow that may be executed in the secondary database management system of FIG. 8.

FIG. 9 is a flowchart showing one example of a process flow 900 that may be executed in the secondary database management system 804. The process flow 900 comprises two columns 901, 903. The column 901 includes operations performed by the coordinator component 814. The column

903 comprises operations performed by an example host 816, 820 performing a source role at the secondary database management system 804.

At operation 902, the coordinator component 814 may receive a redo log 905 from the primary database management system 802. The redo log 905, as described herein, may describe a write operation executed at a host 808, 810, 812 of the primary database management system 802. The redo log 905 may include a description of the host 808, 810, 812 and a description of the write request including, for example, data for implementing the write request.

At operation 904, the coordinator component 814 may determine a source host role at the secondary database management system 804 that is to receive the redo log. For example, the redo log may be directed to a source role corresponding to the source host 808, 810, 812 that executed the corresponding write request at the primary database management system 802.

At operation 906, the coordinator component 814 may determine if the redo log 905 is the next redo log associated with the determined source role. For example, if redo logs are received from the primary database management system 802 out of order, there may be one or more unreceived redo logs that were directed to the same source role before the redo log 905. If the host performing the source role replays the redo log 905 before replaying the intervening redo logs, the data at the host may be corrupted. Coordinator component 814 may determine if the redo log 905 is the next redo log in any suitable manner. For example, redo logs received from the primary database management system 802 may be numbered or otherwise marked with an indication of the order of the redo logs.

If the redo log 905 is not the next redo log for the determined source role, then coordinator component 814 may cache the redo log 905 at operation 908. Upon caching the redo log 905 at operation 908, coordinator component 814, at operation 912, may wait to receive the next redo log from the primary database management system 802. When the next redo log is received, the coordinator component may return to operation 904.

If, at operation 906, the coordinator component 814 determines that the redo log 905 is the next redo log for the determined source role, then, at operation 910, the coordinator component 814 may send redo log data 907 to a first host that is performing the determined source role. The redo log data 907 may include the redo log 905. The redo log data 907 may optionally include any other redo logs that have been cached for the determined source role. For example, the redo log data 907 may include a single redo log (e.g. redo log 905) or may include multiple redo logs (e.g. including the redo log 905). In examples in which the redo log data 907 comprises more than one redo log, the redo log data 907 may also include an indication of an order of the redo logs.

Upon receiving the redo log data 907, the first host may replay a first redo log from the redo log data 907 at operation 914. The first host may be configured to replay the redo logs in order. For example, if there is more than one redo log included with the redo log data, the first host may select the redo log that is oldest or earliest in time and replay that redo log first.

At operation 916, the first host may send the redo log to a second host that is performing the replica role associated with the source role being performed by the first host. Upon receiving the redo log, the second host may replay the redo log. When the first host receives confirmation that the second host has replayed the redo log, the first host may commit the transaction implementing the replay at operation 918. This may maintain the second host as an asynchronous replica of the first host.

At operation 920, the first host determines if any additional redo logs were included with the redo log data 907. If no additional redo logs were included with the redo log data 907, then the first host may wait to receive redo log data from the coordinator component 814 at operation 922. If one or more additional redo logs were included with the redo log data 907, then the first host may access the next redo log from the redo log data 907 at operation 924 and return to operation 914 to replay the next redo log.

Figure 10:
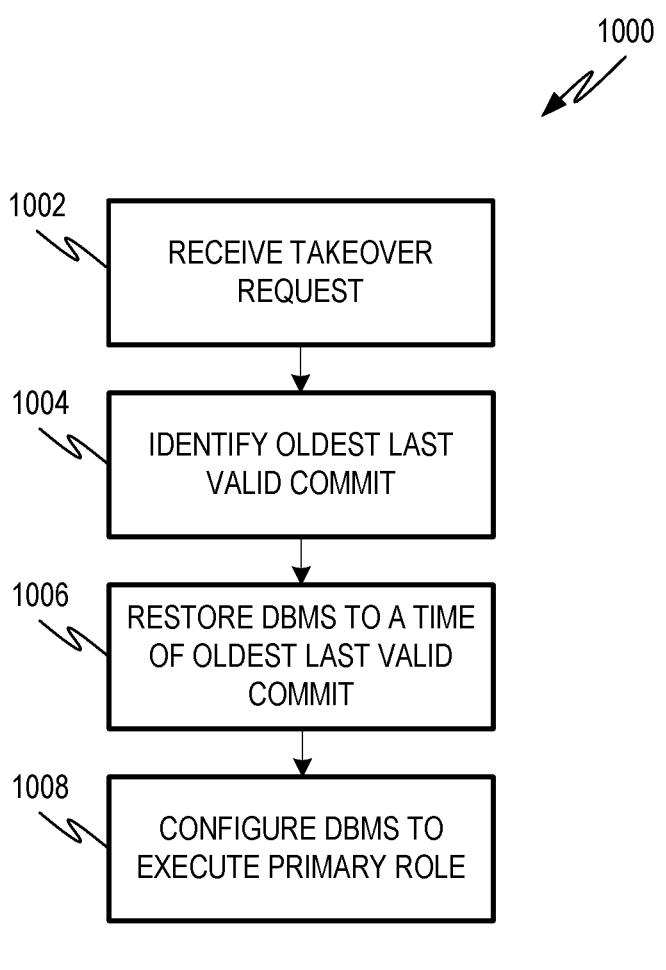
FIG. 10 is a flowchart showing one example of a process flow that may be executed by the coordinator component of FIG. 8 to respond to a takeover request.

FIG. 10 is a flowchart showing one example of a process flow 1000 that may be executed by the coordinator component 814 to respond to a takeover request. It will be appreciated that, in an arrangement at which an asynchronously replicated secondary database management system comprises multiple synchronously replicated hosts, not all of the hosts and their replicas will reflect the state of the primary database management system at the same time. Accordingly, the coordinator component 814 may select the source role host having the oldest last valid commit and revert all of the hosts at the secondary database management system 804 to the time of the oldest last valid commit. Determining the oldest last valid commit may include comparing last valid commits at different source roles.

At operation 1002, the coordinator component 814 may receive a takeover request. The takeover request may include data indicating that the secondary database management system 804 is to assume the role of the primary database management system 802. At operation 1004, the coordinator component 814 may identify the oldest last valid commit at a host 816, 820 performing a source role. Each host performing a source role, such as hosts 816, 822, may have a last valid commit. The last valid commit is the most recent write request that was completed and committed at the host performing the source role. As described herein, for example, with respect to FIG. 9, a valid commit at a host performing a source role may occur when the host performing the source role has replayed the relevant replay log or logs and the host performing the corresponding replica role has also replayed the relevant replay log or logs. The oldest last valid commit at the secondary database management system 804 may be the last valid commit at a host performing a source role the correspondence to the earliest time at the primary database management system 802.

At operation 1006, the coordinator component 814 may revert the hosts 816, 818, 820, 822 to the time of the oldest last valid commit identified at operation 1004. The host performing the source role associated with the oldest last valid commit and the host performing the corresponding replica role may already be synchronized with the primary database management system 802 at the time of the last valid commit. Other hosts may be reverted by replaying one or more replay logs in reverse. For example, the coordinator component 814 may instruct a host performing a source role to replay one or more redo logs in reverse until reaching the time of the oldest last valid commit. The host performing the source role may replay the redo logs in reverse and commit the replay after receiving confirmation that the host performing the corresponding replica role has also replay the redo logs in reverse.

At operation 1008, the coordinator component 814 may configure the secondary database management system 804 to perform the role of the primary database management system 802. For example, the secondary database management system 804 may be configured to receive requests from clients 806 including, for example, read requests and write requests.

EXAMPLES

Example 1 is a database management system comprising: at least one processor programmed to perform operations comprising: executing a first host at a first container of a cloud environment, the first host being of a first version, and the first host being configured to perform a source role; executing a second host at a second container of the cloud environment, the second host being of a second version different than the first version, and the second host being configured to perform a replica role for the source role; receiving, by a network layer executing at the cloud environment, a first request directed to the second host; determining, by the network layer, that the first request is consistent with allowed request data describing allowed requests; and sending, by the network layer, the first request to the second host at the second container.

In Example 2, the subject matter of Example 1 optionally includes the operations further comprising: receiving, by the network layer, a second request directed to the second host; determining, by the network layer, that the second request is not consistent with the allowed request data; and sending, by the network layer, the second request to the first host.

In Example 3, the subject matter of Example 2 optionally includes the second request being a read request and the first request being a replication request.

In Example 4, the subject matter of any one or more of Examples 1-3 optionally includes the operations further comprising: receiving, by the network layer, a third request directed from the second host to the first host; determining, by the network layer, that the third request is not consistent with the allowed request data; and blocking, by the network layer, the third request.

In Example 5, the subject matter of any one or more of Examples 1-4 optionally includes the operations further comprising, before receiving the first request: receiving an upgrade instruction indicating a version upgrade for the first host and the second host; shutting down the second host; upgrading the second host to the second version; and restarting the second host at the second container.

In Example 6, the subject matter of Example 5 optionally includes the operations further comprising: receiving an indication that the second host is synchronized with the first host executing at the first container; and configuring the second host to execute the source role.

In Example 7, the subject matter of Example 6 optionally includes the operations further comprising: shutting down the first host at the first container; upgrading the first host to the second version; and restarting the first host at a new container of the cloud environment, the first host restarted at the new container being configured to perform the replica role for the source role.

In Example 8, the subject matter of any one or more of Examples 1-7 optionally includes the operations further comprising: receiving an indication that the first host executing at the first container has crashed; and configuring the second host to execute the source role.

Example 9 is a method for operating a database management system, the method comprising: executing a first host at a first container of a cloud environment, the first host being of a first version, and the first host being configured to perform a source role; executing a second host at a second container of the cloud environment, the second host being of a second version different than the first version, and the second host being configured to perform a replica role for the source role; receiving, by a network layer executing at the cloud environment, a first request directed to the second host; determining, by the network layer, that the first request is consistent with allowed request data describing allowed requests; and sending, by the network layer, the first request to the second host at the second container.

In Example 10, the subject matter of Example 9 optionally includes receiving, by the network layer, a second request directed to the second host; determining, by the network layer, that the second request is not consistent with the allowed request data; and sending, by the network layer, the second request to the first host.

In Example 11, the subject matter of Example 10 optionally includes the second request being a read request and the first request being a replication request.

In Example 12, the subject matter of any one or more of Examples 9-11 optionally includes receiving, by the network layer, a third request directed from the second host to the first host; determining, by the network layer, that the third request is not consistent with the allowed request data; and blocking, by the network layer, the third request.

In Example 13, the subject matter of any one or more of Examples 9-12 optionally includes before receiving the first request: receiving an upgrade instruction indicating a version upgrade for the first host and the second host; shutting down the second host; upgrading the second host to the second version; and restarting the second host at the second container.

In Example 14, the subject matter of Example 13 optionally includes receiving an indication that the second host is synchronized with the first host executing at the first container; and configuring the second host to execute the source role.

In Example 15, the subject matter of Example 14 optionally includes shutting down the first host at the first container; upgrading the first host to the second version; and restarting the first host at a new container of the cloud environment, the first host restarted at the new container being configured to perform the replica role for the source role.

In Example 16, the subject matter of any one or more of Examples 9-15 optionally includes receiving an indication that the first host executing at the first container has crashed; and configuring the second host to execute the source role.

Example 17 is a non-transitory machine-readable medium comprising instructions thereon that, when executed by at least one processor, cause the at least one processor to perform operations comprising: executing a first host at a first container of a cloud environment, the first host being of a first version, and the first host being configured to perform a source role; executing a second host at a second container of the cloud environment, the second host being of a second version different than the first version, and the second host being configured to perform a replica role for the source role; receiving, by a network layer executing at the cloud environment, a first request directed to the second host; determining, by the network layer, that the first request is consistent with allowed request data describing allowed requests; and sending, by the network layer, the first request to the second host at the second container.

In Example 18, the subject matter of Example 17 optionally includes the operations further comprising: receiving, by the network layer, a second request directed to the second host, the second request; determining, by the network layer, that the second request is not consistent with the allowed request data; and sending, by the network layer, the second request to the first host.

In Example 19, the subject matter of Example 18 optionally includes the second request being a read request and the first request being a replication request.

In Example 20, the subject matter of any one or more of Examples 17-19 optionally includes the operations further comprising: receiving, by the network layer, a third request directed from the second host to the first host; determining, by the network layer, that the third request is not consistent with the allowed request data; and blocking, by the network layer, the third request.

Figure 11:
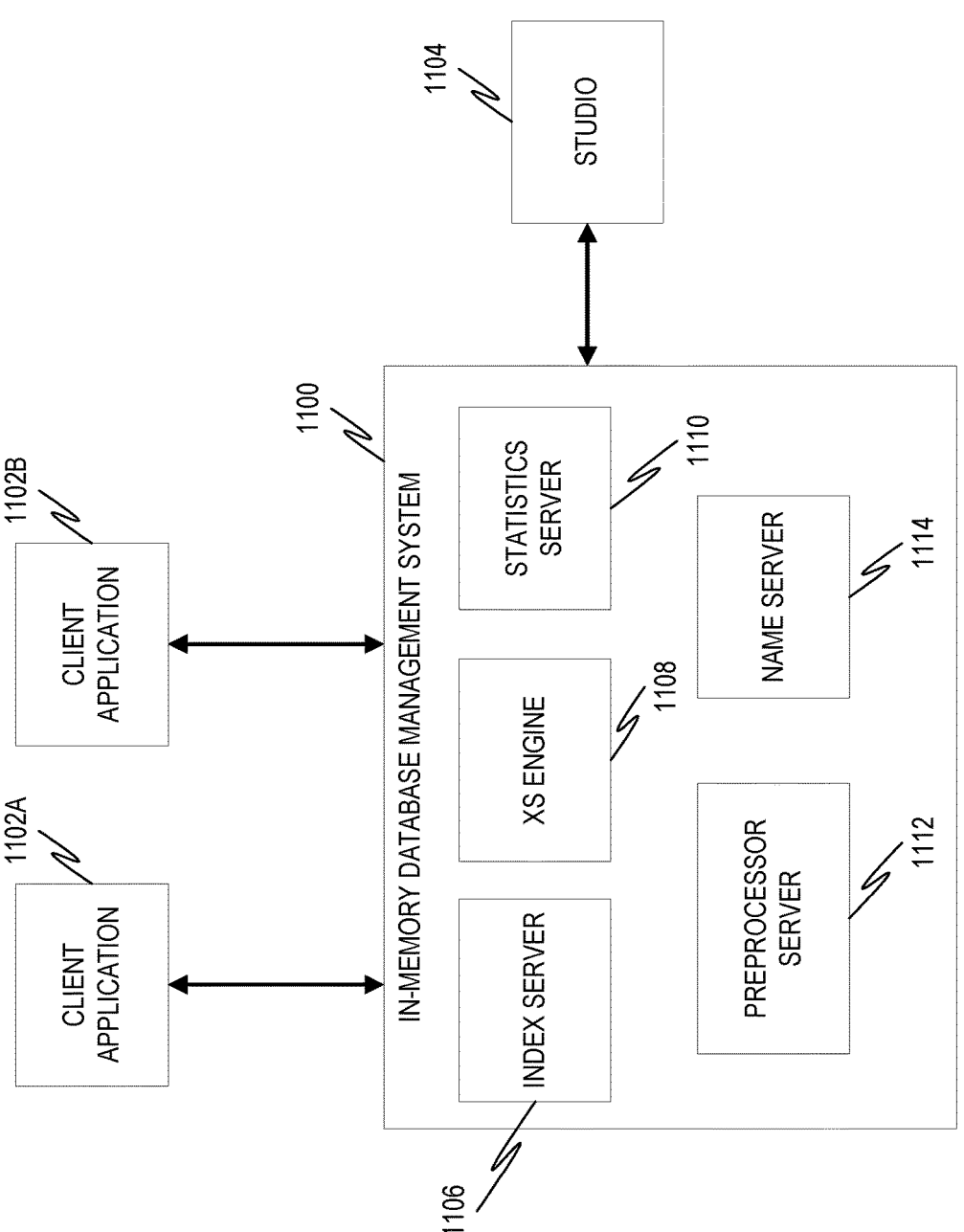
FIG. 11 is a diagram illustrating an example of in-memory database management system that may be used to implement table privilege management, for example, as described herein.

FIG. 11 is a diagram illustrating an example of an in-memory database management system 1100. An in-memory database stores data primarily at main memory, such as a random-access memory, as described herein. This is different than databases that primarily employ a disk storage mechanism. In some examples, the database management system 1100 may be or include an example of the HANA system from SAP SE of Walldorf, Germany. Although various features of environmental metric integration are described herein in the context of an in-memory database, carbon footprint optimization may be generally performed at any suitable database management system.

The in-memory database management system 1100 may be coupled to one or more clients 1102A, 1102B. Clients 1102A, 1102B may be similar to clients 104, 106, 108, 806 described herein. The clients 1102A, 1102B may communicate with the in-memory database management system 1100 through a number of different protocols, including Structured Query Language (SQL), Multidimensional Expressions (MDX), Hypertext Transfer Protocol (HTTP), Representational State Transfer (REST), and Hypertext Markup Language (HTML).

FIG. 11 also shows a studio 1104 that may be used to perform modeling by accessing the in-memory database management system 1100. In some examples, the studio 1104 may allow complex analysis to be performed on data drawn not only from real time event data and windows, but also from stored database information. In some examples, carbon footprint data may be generated by the studio as described herein.

The in-memory database management system 1100 may comprise a number of different components, including an index server 1106, an XS engine 1108, a statistics server 1110, a preprocessor server 1112, and a name server 1114. These components may operate on a single computing device or may be spread among multiple computing devices (e.g., separate servers). The index server 1106 contains the actual data and the engines for processing the data. It may also coordinate and use the other servers. In some examples, the various hosts described herein may perform source roles for implementing different instances of index servers similar to the index server 1106.

The XS engine 1108 allows clients to connect to the in-memory database management system 1100 using web protocols, such as HTTP. Although the XS engine 1108 is illustrated as a component of the in-memory database management system 1100, in some examples, the XS engine may be implemented as one or more APIs and/or services positioned between the clients 1102A, 1102B and the in-memory database management system 1100. In some examples, the XS engine 1108 may handle client requests received in languages other than SQL such as, for example, MDX, HTTP, REST, HTML, and the like.

The statistics server 1110 collects information about status, performance, and resource consumption from all the other server components. The statistics server 1110 can be accessed from the studio 1104 to obtain the status of various alert monitors.

The preprocessor server 1112 is used for analyzing text data and extracting the information on which the text search capabilities are based.

The name server 1114 holds information about the database topology. This is used in a distributed system with instances of the database on different hosts. The name server 1114 knows where the components are running and which data is located on which server. In an example embodiment, a separate enqueue server may operate in the manner described above with respect to enqueue servers, specifically with regard to creating and managing light-weight enqueue sessions.

Figure 12:
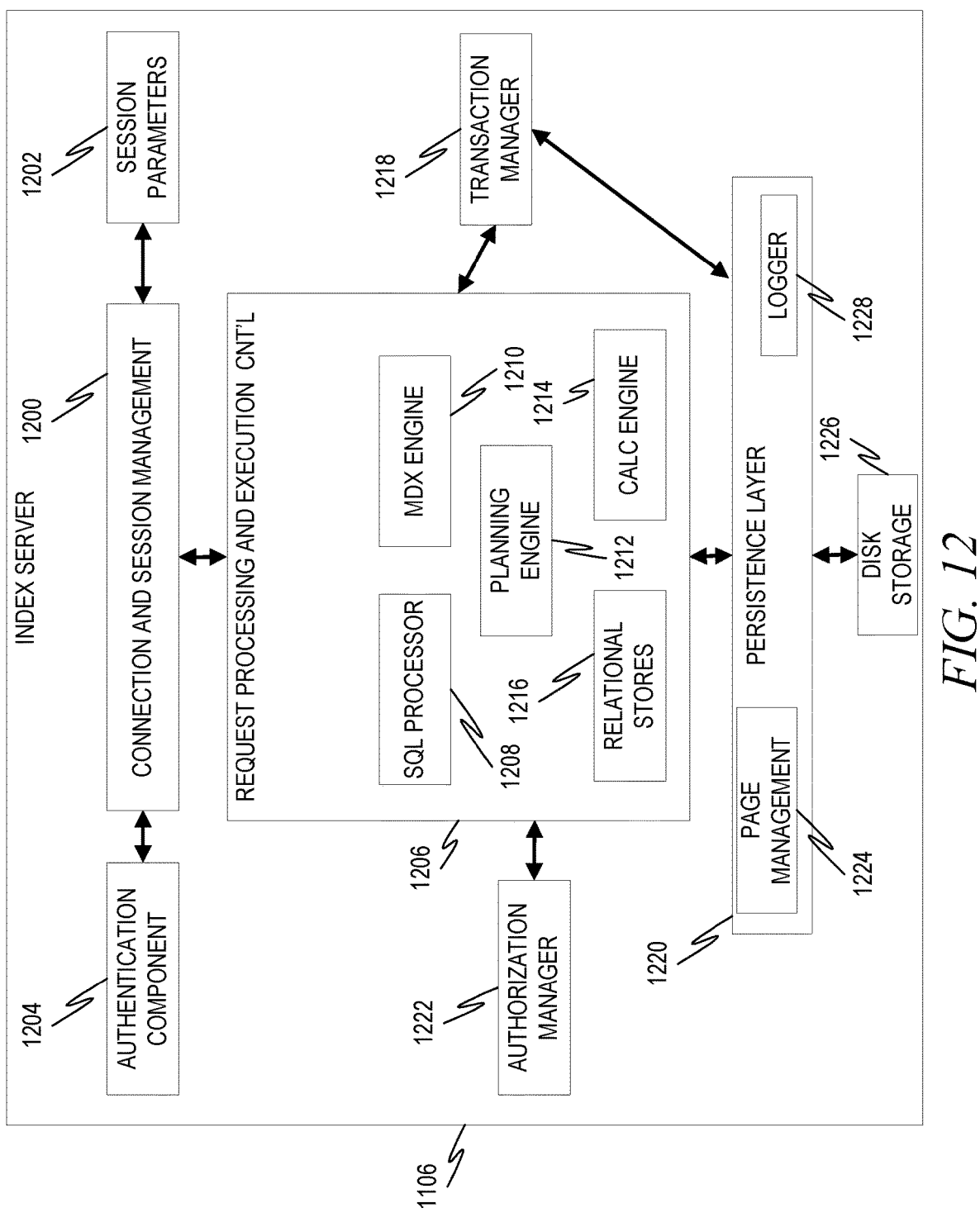
FIG. 12 is a diagram illustrating an example of an index server of the in-memory database management system of FIG. 11.

FIG. 12 is a diagram illustrating an example of the index server 1106. Specifically, the index server 1106 of FIG. 11 is depicted in more detail. The index server 1106 includes a connection and session management component 1200, which is responsible for creating and managing sessions and connections for the database clients (e.g. clients 1102A, 1102B). Once a session is established, clients can communicate with the database management system using SQL statements. For each session, a set of session parameters 1202 may be maintained, such as auto-commit, current transaction isolation level, and so forth. Users (e.g., system administrators, developers) may be authenticated by the database management system itself (e.g., by logging in with log-in information such as a user name and password, using an authentication component 1204) or authentication can be delegated to an external authentication provider such as a Lightweight Directory Access Protocol (LDAP) directory.

Client requests can be analyzed and executed by a set of components summarized as request processing and execution control 1206. An SQL processor 1208 checks the syntax and semantics of the client SQL statements and generates a logical execution plan. MDX is a language for querying and manipulating multidimensional data stored in OLAP cubes. As such, an MDX engine 1210 may be provided to allow for the parsing and executing of MDX commands. A planning engine 1212 allows applications to execute basic planning operations in the database layer. One such operation is to create a new version of a dataset as a copy of an existing dataset, while applying filters and transformations.

A calculation engine 1214 implements the various SQL script and planning operations. The calculation engine 1214 creates a logical execution plan for calculation models derived from SQL script, MDX, planning, and domain-specific models. This logical execution plan may include, for example, breaking up a model into operations that can be processed in parallel. The data is stored in relational stores 1216, which implement a relational database in a main memory. Each SQL statement may be processed in the context of a transaction. New sessions are implicitly assigned to a new transaction. A transaction manager 1218 coordinates database transactions, controls transactional isolation, and keeps track of running and closed transactions. When a transaction is committed or rolled back, the transaction manager 1218 informs the involved engines about this event so they can execute needed actions. The transaction manager 1218 also cooperates with a persistence layer 1220 to achieve atomic and durable transactions.

An authorization manager 1222 is invoked by other database management system components to check whether the user has the specified privileges to execute the requested operations. The database management system allows for the granting of privileges to users or roles. A privilege grants the right to perform a specified operation on a specified object.

The persistence layer 1220 ensures that the database is restored to the most recent committed state after a restart and that transactions are either completely executed or completely undone. To achieve this goal in an efficient way, the persistence layer 1220 uses a combination of redo logs, shadow paging, and snapshot data taken at one or more save points. The persistence layer 1220 also offers a page management interface 1224 for writing and reading data to a separate disk storage 1226 and also contains a logger 1228 that manages the transaction log. Log entries can be written implicitly by the persistence layer 1220 when data is written via the persistence interface or explicitly by using a log interface.

Figure 13:
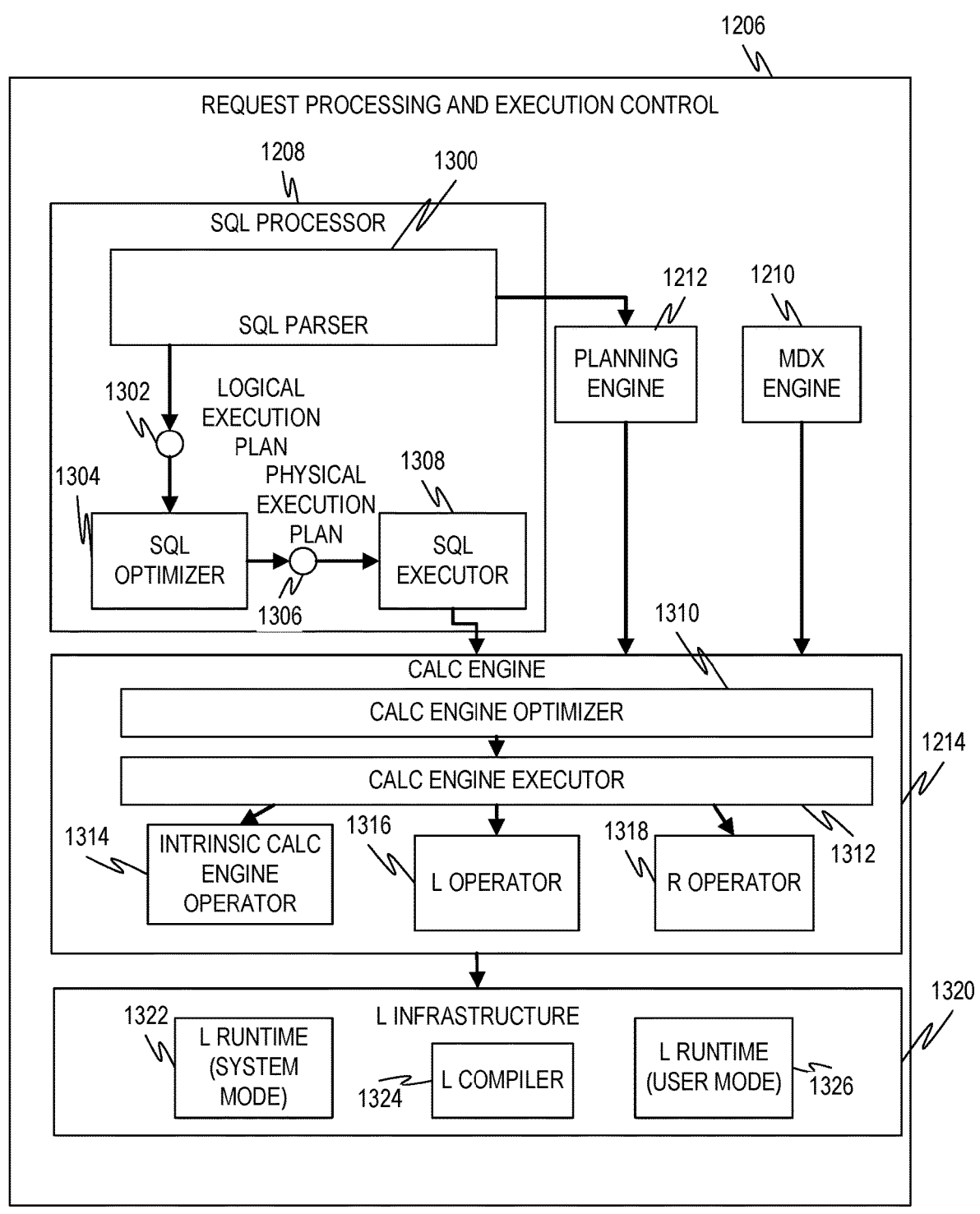
FIG. 13 is a diagram illustrating one example of the request processing and execution control of the database management system of FIG. 12.

FIG. 13 is a diagram illustrating one example of the request processing and execution control 1206. This diagram depicts the request processing and execution control 1206 of FIG. 12 in more detail. The SQL processor 1208 contains an SQL parser 1300, which parses the SQL statement and generates a logical execution plan 1302, which it passes to a SQL optimizer 1304. The SQL optimizer 1304 optimizes the logical execution plan 1302 and converts it to a physical execution plan 1306, which it then passes to a SQL executor 1308. The calculation engine 1214 implements the various SQL script and planning operations, and includes a calc engine optimizer 1310, which optimizes the operations, and a calc engine executor 1312, which executes the operations, as well as an intrinsic calc engine operator 1314, an L operator 1316, and an R operator 1318.

An L infrastructure 1320 includes a number of components to aid in the running of L procedures, including an L-runtime (system mode) 1322, an L compiler 1324, and an L-runtime (User mode) 1326.

Figure 14:
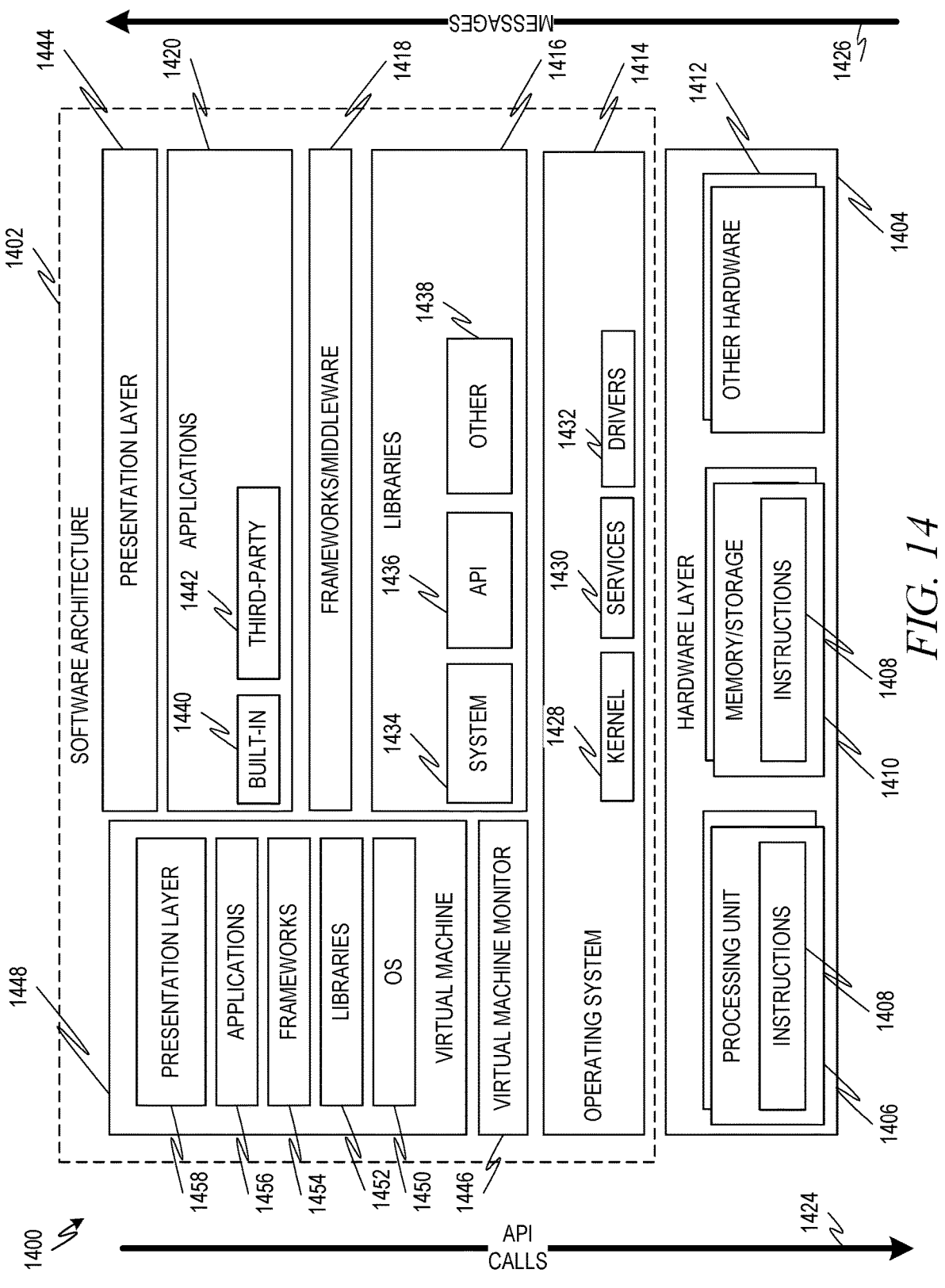
FIG. 14 is a block diagram showing one example of an architecture for a computing device.

FIG. 14 is a block diagram 1400 showing one example of a software architecture 1402 for a computing device. The architecture 1402 may be used in conjunction with various hardware architectures, for example, as described herein. FIG. 14 is merely a non-limiting example of a software architecture and many other architectures may be implemented to facilitate the functionality described herein. A representative hardware layer 1404 is illustrated and can represent, for example, any of the above referenced computing devices. In some examples, the hardware layer 1404 may be implemented according to the architecture of the computer system of FIG. 15.

The representative hardware layer 1404 comprises one or more processing units 1406 having associated executable instructions 1408. Executable instructions 1408 represent the executable instructions of the software architecture 1402, including implementation of the methods, modules, subsystems, and components, and so forth described herein, and may also include memory and/or storage modules 1410, which also have executable instructions 1408. Hardware layer 1404 may also comprise other hardware as indicated by other hardware 1412 which represents any other hardware of the hardware layer 1404, such as the other hardware illustrated as part of the architecture 1402.

In the example architecture of FIG. 14, the software architecture 1402 may be conceptualized as a stack of layers where each layer provides particular functionality. For example, the software architecture 1402 may include layers such as an operating system 1414, libraries 1416, middleware layer 1418, applications 1420, and presentation layer 1444. Operationally, the applications 1420 and/or other components within the layers may invoke API calls 1424 through the software stack and access a response, returned values, and so forth illustrated as messages 1426 in response to the API calls 1424. The layers illustrated are representative in nature and not all software architectures have all layers. For example, some mobile or special purpose operating systems may not provide a middleware layer 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of an interrupt and, in response, cause the architecture 1402 to pause its current processing and execute an interrupt service routine (ISR) when an interrupt is accessed.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than to interface directly with the underlying operating system 1414 functionality (e.g., kernel 1428, services 1430 and/or drivers 1432). The libraries 1416 may include system 1434 libraries (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The middleware layer 1418 (also sometimes referred to as frameworks) may provide a higher-level common infrastructure that may be utilized by the applications 1420 and/or other software components/modules. For example, the middleware layer 1418 may provide various graphic user interface (GUI) functions, high-level resource management, high-level location services, and so forth. The middleware layer 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. Third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1442 may invoke the API calls 1424 provided by the mobile operating system such as operating system 1414 to facilitate functionality described herein.

The applications 1420 may utilize built-in operating system functions (e.g., kernel 1428, services 1430, and/or drivers 1432), libraries (e.g., system 1434, API libraries 1436, and other libraries 1438), and middleware layer 1418 to create user interfaces to interact with users of the system. Alternatively, or additionally, in some systems interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware computing device. A virtual machine is hosted by a host operating system (operating system 1414) and typically, although not always, has a virtual machine monitor 1446, which manages the operation of the virtual machine 1448 as well as the interface with the host operating system (i.e., operating system 1414). A software architecture executes within the virtual machine 1448 such as an operating system 1450, libraries 1452, frameworks/middleware 1454, applications 1456, and/or presentation layer 1458. These layers of software architecture executing within the virtual machine 1448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 15:
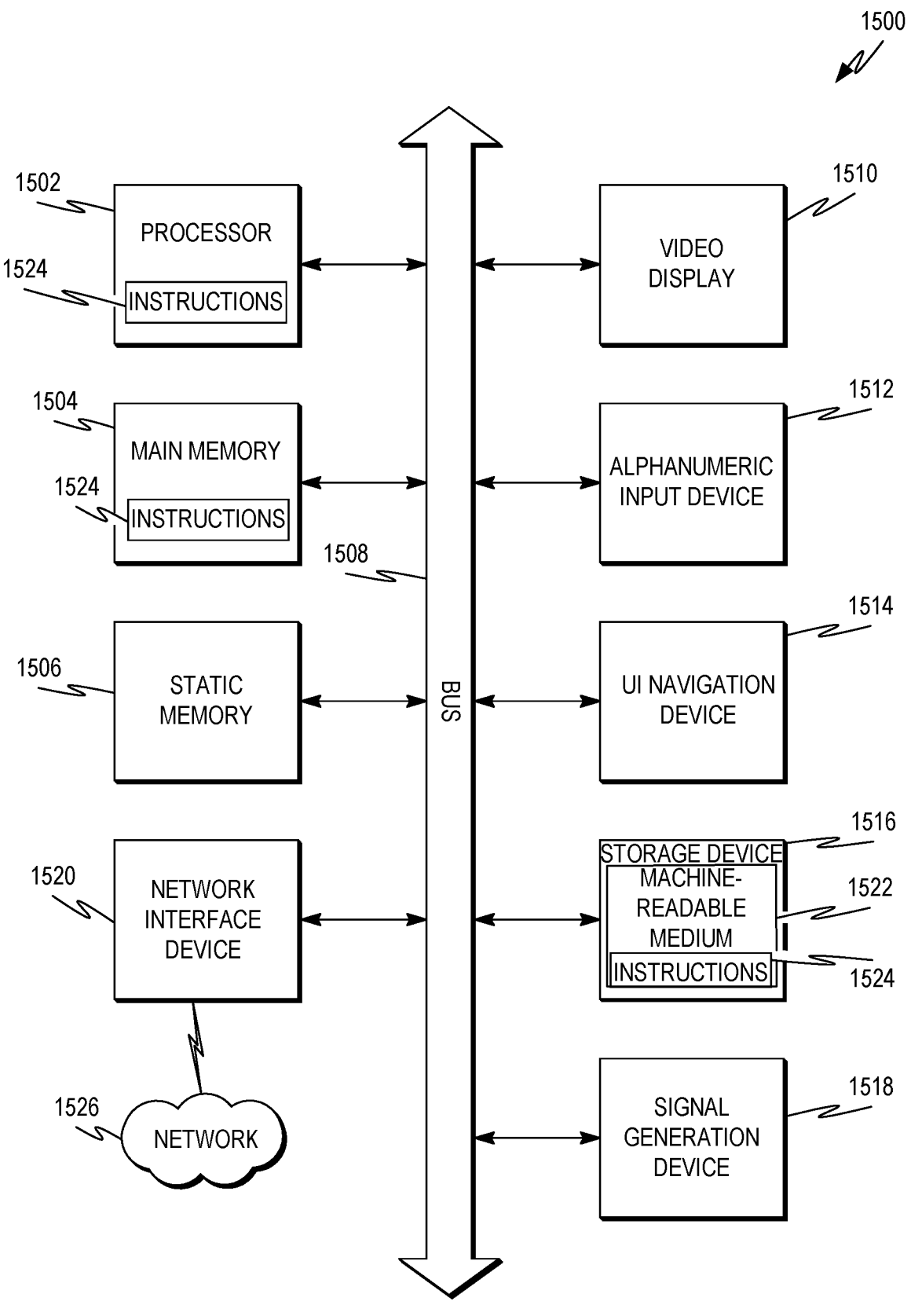
FIG. 15 is a block diagram of a machine in the example form of a computer system within which instructions may be executed for causing the machine to perform any one or more of the methodologies discussed herein.

FIG. 15 is a block diagram of a machine in the example form of a computer system 1500 within which instructions 1524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a CPU, a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding, or carrying instructions 1524 for execution by the machine and that cause the machine to perform any one or more of the methodologies of the present disclosure, or that is capable of storing, encoding, or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks: magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A multi-host database management system comprising:
at least one processor programmed to perform operations comprising:
    executing a first host at a first container of a cloud environment, the first host being of a first version, the first host being configured to manage a first data volume of the database management system, and the first host being configured to perform a source role for data stored at the first data volume;
    executing a second host at a second container of the cloud environment, the second host being of a second version different than the first version, the second host being configured to manage a second data volume of the database management system, and the second host being configured to perform a replica role for the source role;
    receiving, by a network layer executing at the cloud environment, a first request directed to the second host;
    determining, by the network layer, that the first request is consistent with allowed request data describing allowed requests; and
    sending, by the network layer, the first request to the second host at the second container.

2. The database management system of claim 1, the operations further comprising:
    receiving, by the network layer, a second request directed to the second host;
    determining, by the network layer, that the second request is not consistent with the allowed request data; and
    sending, by the network layer, the second request to the first host.

3. The database management system of claim 2, the second request being a read request and the first request being a replication request.

4. The database management system of claim 1, the operations further comprising:
    receiving, by the network layer, a third request directed from the second host to the first host;
    determining, by the network layer, that the third request is not consistent with the allowed request data; and
    blocking, by the network layer, the third request.

5. The database management system of claim 1, the operations further comprising, before receiving the first request:
    receiving an upgrade instruction indicating a version upgrade for the first host and the second host;
    shutting down the second host;
    upgrading the second host to the second version; and
    restarting the second host at the second container.

6. The database management system of claim 5, the operations further comprising:
    receiving an indication that the second host is synchronized with the first host executing at the first container; and
    configuring the second host to execute the source role.

7. The database management system of claim 6, the operations further comprising:
    shutting down the first host at the first container;
    upgrading the first host to the second version; and
    restarting the first host at a new container of the cloud environment, the first host restarted at the new container being configured to perform the replica role for the source role.

8. The database management system of claim 1, the operations further comprising:
    receiving an indication that the first host executing at the first container has crashed; and
    configuring the second host to execute the source role.

9. A method for operating a database management system, the method comprising:
    executing a first host at a first container of a cloud environment, the first host being of a first version, the first host being configured to manage a first data volume of the database management system, and the first host being configured to perform a source role for data stored at the first data volume;
    executing a second host at a second container of the cloud environment, the second host being of a second version different than the first version, the second host being configured to manage a second data volume of the database management system, and the second host being configured to perform a replica role for the source role;
    receiving, by a network layer executing at the cloud environment, a first request directed to the second host;
    determining, by the network layer, that the first request is consistent with allowed request data describing allowed requests; and
    sending, by the network layer, the first request to the second host at the second container.

10. The method of claim 9, further comprising:

receiving, by the network layer, a second request directed to the second host;

determining, by the network layer, that the second request is not consistent with the allowed request data; and sending, by the network layer, the second request to the first host.

11. The method of claim 10, the second request being a read request and the first request being a replication request.

12. The method of claim 9, further comprising:

receiving, by the network layer, a third request directed from the second host to the first host;

determining, by the network layer, that the third request is not consistent with the allowed request data; and blocking, by the network layer, the third request.

13. The method of claim 9, further comprising, before receiving the first request:

receiving an upgrade instruction indicating a version upgrade for the first host and the second host;

shutting down the second host;

upgrading the second host to the second version; and restarting the second host at the second container.

14. The method of claim 13, further comprising:

receiving an indication that the second host is synchronized with the first host executing at the first container; and configuring the second host to execute the source role.

15. The method of claim 14, further comprising:

shutting down the first host at the first container;

upgrading the first host to the second version; and restarting the first host at a new container of the cloud environment, the first host restarted at the new container being configured to perform the replica role for the source role.

16. The method of claim 9, further comprising:

receiving an indication that the first host executing at the first container has crashed; and configuring the second host to execute the source role.

17. A non-transitory machine-readable medium comprising instructions thereon that, when executed by at least one processor, cause the at least one processor to perform operations comprising:

executing a first host at a first container of a cloud environment, the first host being of a first version, the first host being configured to manage a first data volume of a database management system, and the first host being configured to perform a source role for data stored at the first data volume;

executing a second host at a second container of the cloud environment, the second host being of a second version different than the first version, the second host being configured to manage a second data volume of the database management system, and the second host being configured to perform a replica role for the source role;

receiving, by a network layer executing at the cloud environment, a first request directed to the second host;

determining, by the network layer, that the first request is consistent with allowed request data describing allowed requests; and sending, by the network layer, the first request to the second host at the second container.

18. The medium of claim 17, the operations further comprising:

receiving, by the network layer, a second request directed to the second host, the second request;

determining, by the network layer, that the second request is not consistent with the allowed request data; and sending, by the network layer, the second request to the first host.

19. The medium of claim 18, the second request being a read request and the first request being a replication request.

20. The medium of claim 17, the operations further comprising:

receiving, by the network layer, a third request directed from the second host to the first host;

determining, by the network layer, that the third request is not consistent with the allowed request data; and blocking, by the network layer, the third request.

* * * * *